(12) United States Patent
DeCoste et al.

(10) Patent No.: US 8,260,786 B2
(45) Date of Patent: Sep. 4, 2012

(54) METHOD AND APPARATUS FOR CATEGORIZING AND PRESENTING DOCUMENTS OF A DISTRIBUTED DATABASE

(75) Inventors: Dennis M. DeCoste, La Canada, CA (US); Gary W. Flake, San Jose, CA (US); Peter Savich, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 972 days.

(21) Appl. No.: 11/061,974

(22) Filed: Feb. 17, 2005

(65) Prior Publication Data
US 2005/0251496 A1    Nov. 10, 2005

Related U.S. Application Data

(63) Continuation-in-part of application No. 10/155,290, filed on May 24, 2002, now Pat. No. 7,231,395.

(51) Int. Cl.
*G06F 7/00* (2006.01)
(52) U.S. Cl. ......................................... 707/748
(58) Field of Classification Search .................. 707/3, 5, 707/723, 748, 749, 737, 740
See application file for complete search history.

(56) References Cited

U.S. PATENT DOCUMENTS

| | | | |
|---|---|---|---|
| 5,515,488 A * | 5/1996 | Hoppe et al. ................. | 345/440 |
| 5,623,660 A | 4/1997 | Josephson | |
| 5,659,732 A | 8/1997 | Kirsch | |
| 5,704,060 A | 12/1997 | Del Monte | |
| 5,717,923 A | 2/1998 | Dedrick | |
| 5,724,424 A | 3/1998 | Gifford | |
| 5,724,521 A | 3/1998 | Dedrick | |
| 5,724,524 A | 3/1998 | Hunt et al. | |
| 5,742,816 A | 4/1998 | Barr et al. | |
| 5,748,954 A | 5/1998 | Maudlin | |
| 5,752,238 A | 5/1998 | Dedrick | |
| 5,768,521 A | 6/1998 | Dedrick | |
| 5,778,367 A | 7/1998 | Wesinger, Jr. et al. | |
| 5,794,210 A | 8/1998 | Goldhaber et al. | |
| 5,826,241 A | 10/1998 | Stein et al. | |
| 5,826,267 A | 10/1998 | McMillan | |

(Continued)

FOREIGN PATENT DOCUMENTS

CA    2310931    1/2001

(Continued)

OTHER PUBLICATIONS

Nowell et al., "Visualizing Search Results: Some Alternative to Query-Document Similarity," 1996, ACM, pp. 67-75.*

(Continued)

*Primary Examiner* — Robert Timblin
(74) *Attorney, Agent, or Firm* — Nathan O. Greene; Brinks Hofer Gilson & Lione

(57) ABSTRACT

A method for providing search results to a user is disclosed. The method includes receiving a first set of information associated with a plurality of web pages. A second set of information associated with a user preference, determining a commercial score for each web page is also received. A subset of the first set of information is determined based on the second set of information. A visual indicator for the subset of the first set of information is generated in accordance with a commercial score, and the subset and the visual indicator are displayed on a display.

23 Claims, 14 Drawing Sheets

U.S. PATENT DOCUMENTS

| | | | |
|---|---|---|---|
| 5,848,397 A | 12/1998 | Marsh et al. | |
| 5,848,407 A | 12/1998 | Ishikawa et al. | |
| 5,852,820 A | 12/1998 | Burrows | |
| 5,855,008 A | 12/1998 | Goldhaber et al. | |
| 5,862,223 A | 1/1999 | Walker et al. | |
| 5,864,845 A | 1/1999 | Voorhees et al. | |
| 5,864,846 A | 1/1999 | Voorhees et al. | |
| 5,886,698 A * | 3/1999 | Sciammarella et al. | 715/769 |
| 5,895,470 A | 4/1999 | Pirolli et al. | |
| 5,903,882 A | 5/1999 | Asay et al. | |
| 5,918,014 A | 6/1999 | Robinson | |
| 5,920,854 A | 7/1999 | Kirsch et al. | |
| 5,920,859 A | 7/1999 | Li | |
| 5,924,090 A | 7/1999 | Krellenstein et al. | |
| 5,930,777 A | 7/1999 | Barber | |
| 5,933,145 A * | 8/1999 | Meek | 715/835 |
| 5,966,126 A * | 10/1999 | Szabo | 715/762 |
| 6,012,053 A * | 1/2000 | Pant et al. | 707/3 |
| 6,014,664 A | 1/2000 | Fagin et al. | |
| 6,028,605 A | 2/2000 | Conrad et al. | |
| 6,038,574 A * | 3/2000 | Pitkow et al. | 715/513 |
| 6,041,331 A | 3/2000 | Weiner et al. | |
| 6,073,135 A | 6/2000 | Broder et al. | |
| 6,078,866 A | 6/2000 | Buck et al. | |
| 6,182,065 B1 | 1/2001 | Yeomans | |
| 6,269,361 B1 | 7/2001 | Davis et al. | |
| 6,285,987 B1 | 9/2001 | Roth et al. | |
| 6,285,999 B1 | 9/2001 | Page | |
| 6,353,825 B1 | 3/2002 | Ponte | |
| 6,356,898 B2 | 3/2002 | Cohen et al. | |
| 6,385,602 B1 | 5/2002 | Tso et al. | |
| 6,389,436 B1 | 5/2002 | Chakrabarti et al. | |
| 6,457,004 B1 * | 9/2002 | Nishioka et al. | 707/5 |
| 6,594,670 B1 * | 7/2003 | Genser | 707/102 |
| 6,606,657 B1 * | 8/2003 | Zilberstein et al. | 709/224 |
| 6,654,743 B1 | 11/2003 | Hogg et al. | |
| 6,665,665 B1 | 12/2003 | Ponte | |
| 6,694,307 B2 | 2/2004 | Julien | |
| 6,711,569 B1 * | 3/2004 | Bushee | 1/1 |
| 6,721,721 B1 * | 4/2004 | Bates et al. | 707/1 |
| 6,775,665 B1 | 8/2004 | Piersol | |
| 6,785,671 B1 * | 8/2004 | Bailey et al. | 705/26.81 |
| 6,826,594 B1 | 11/2004 | Pettersen | |
| 6,836,768 B1 * | 12/2004 | Hirsch | 707/3 |
| 6,963,867 B2 * | 11/2005 | Ford et al. | 707/752 |
| 6,965,900 B2 | 11/2005 | Srinivasa et al. | |
| 2002/0004735 A1 | 1/2002 | Gross | |
| 2002/0077998 A1 | 6/2002 | Andrews et al. | |
| 2002/0169770 A1 | 11/2002 | Kim et al. | |
| 2003/0093316 A1 * | 5/2003 | Wirth, Jr. et al. | 705/14 |
| 2003/0149937 A1 | 8/2003 | McElfresh et al. | |
| 2003/0149938 A1 | 8/2003 | McElfresh et al. | |
| 2003/0220912 A1 * | 11/2003 | Fain et al. | 707/3 |
| 2004/0103073 A1 * | 5/2004 | Blake et al. | 707/1 |

FOREIGN PATENT DOCUMENTS

| | | |
|---|---|---|
| DE | 100 29 644 A1 | 1/2002 |
| EP | 1120722 A2 | 8/2001 |
| JP | 11316764 A | 11/1999 |
| JP | 2001 134616 | 5/2001 |
| WO | WO 97/22066 | 6/1997 |
| WO | WO 99/20486 | 4/1999 |
| WO | WO 99/48028 | 9/1999 |
| WO | WO 00/16218 | 3/2000 |
| WO | WO 00/41090 | 7/2000 |
| WO | WO 01/46870 A1 | 6/2001 |
| WO | WO 01/75728 A1 | 10/2001 |
| WO | WO 02/06993 A1 | 2/2002 |
| WO | WO 00/67162 A | 11/2002 |

OTHER PUBLICATIONS

Hearst, Cat-a-Cone: An Interactive Interface for Specifying Searches and Viewing Retrieval Results Using a Large Category Hierarchy, ACM, 1997, pp. 246-255.*

Richard K. Belew, *A Cognitive Perspective on Search Engine Technology and the WWW*, pp. 253-277, Finding Out About, ISBN 0-521-630280-2, Chapter 7: Adaptive Information Retrieval, Cambridge University Press 2000.

European Search Report from corresponding EPO Patent application No. 03253259.0.

"About SearchUP, Inc.", Jul. 15, 1999, printed from the Internet at: http://www.searchup.com/about.cfm, 2 pages.

"Benefits", Jul. 15, 1999, printed from the Internet at: http://www.searchup.com/benefits.cfm, 3 pages.

"Disclosure Rules", The Industry Standard—The Newsmagazine of the Internet Economy, Aug. 10, 1998, 1 page.

"GoTo.com Gets Venture Funding", Internet World Magazine, Jun. 1, 1998, 1 page.

"Information", Jul. 15, 1999, printed from the Internet at: http://www.searchup.com/information.cfm, 4 pages.

"Testimonials"., Jul. 15, 1999, printed from the Internet at: http://www.searchup.com/testimonials.cfm, 2 pages.

"Tips & Tricks", Jul. 15, 1999, printed from the Internet at: http://www.searchup.com/tipsandtricks.cfm, 4 pages.

"APS Search Tools—Patent Search Client Strategy", by US Patent & Trademark Office, Sep. 199, 5 pages.

"Automated Patent System (APS) Workstation Reference Manual", by US Patent & Trademark Office, Jul. 1996. 3 pages.

"Chapter 1-Introduction to Dialog", by Dialog Information Service, Inc. pp. 1-1 to 1-14.

"Coursey.com", David Coursey's Insider report on Personal Computing, the Internet and Communications, Mar. 1998, 2 pages.

"Frequently Asked Questions NT Image Search & Retrieval (IS&R)", by US Patent & Trademark Office, Dec. 1997, 20 pages.

"Going, Going . . . ", from a Closer Look of the Wall Street Journal-Marketplace, Apr. 1998, 1 page.

"New Service Puts Ad Auction, Search Engine Under One Roof", article from Electronic Advertising & Marketplace Report, Simba Information, Inc. dated Apr. 28, 1998, vol. 12, Issue 8, 2 pages.

"News Watch About Search Engines", printed form the Internet at: http://searchenginewatch.com/news.html, Feb. 1998, 2 pages.

Advertising Age-Interactive Daily Homepage, Feb. 23, 1998, "Search Engine Startup to Auction Listings", printed from the Internet address http://www.adage.com/interactive/mdaily/index.html, 2 pages.

Advertising Age-Interactive Daily Homepage; Jun. 8, 1998,printed from the Internet at: http://www.adage.com/interactive/daily/index.html, 2 pages.

Aguilar, Rose CNET News.com, Apr. 29, 1996, "New Ad Model Charges by the Click", printed from the Internet at: http://www.news.com/News/Item/0,4,1199,00.html, Jul. 29, 1999, 3 pages.

Alyson, Sasha "Searching The Search Engines", Bacon's, May 1998, 1 page.

Article from the Search Engine Report, "GoTo to Sell Positions", Mar. 3, 1998, printed from the Internet at: http://www.searchenginewatch.com/sereport/9803-to-to-html, 1 page.

Berst, Jesse ZDNet, "Search Sites' Shocking Secret", Aug. 17, 1998, printed form the internet at: http://www.zdnet.com/anchordesk/story/story_2432.html, 2 pages.

Brewer, Jeffrey "Pay-For-Performance: Creating More and Better Value", ClickZ Today, Aug. 18, 1998, printed from the Internet at: wysiwyg://37/http://www.clickz.com, 5 pages.

Brin, Sergey et al., "The Anatomy of a Large Scale Hypertextual Web Search Engine", Computer Networks and ISDN Systems, North Holland Publishing, Amsterdam, NL, dated Apr. 14, 1998, pp. 1-20.

Clark, Don "Start-Up Plans Internet Search Service Tying Results to Advertising Spending", The Wall Street Journal, Marketplace Feb. 20, 1998, 1 page.

ClickMail Central directory, printed from the Internet at: http:/www.oneclaick.com/server/specs.html, circa Apr. 1996, 4 pages.

Cliff Kurtzman, "Another Internet Advertising List", Internet Advertising Digest #006, dated Jun. 19, 1996, printed from the Internet at: http://www.o-a.com/archive/1996/june.0021.html, printed Sep. 28, 2001, 5 pages.

Canadian Examiner's Report from corresponding Canadian Patent application No. 2,429,338 dated Apr. 19, 2005.

Correspondence from Bryan Buck, President of SearchUp.com, dated Jul. 7, 1999, 1 page.

Correspondence from Emilia F. Cannella to Andrew Conru, Vote Publishing regarding galore.com, Jun. 30, 1999, 2 pages.
Correspondence from Emilia F. Cannella to Michael Melcher, MC Services regarding SearchUP.com, Jul. 1, 1999, 3 pages.
Correspondence from Emilia F. Cannella to Mr. D. Reed, Reports Galore, regarding hitsgalore.com, Jun. 30, 1999, 2 pages.
Correspondence from Emilia F. Cannella to Robert Brahms, CEO of BeFirst Internet Corporation regarding findwhat.com, Jul. 20, 1999, 2 pages.
Correspondence from Emilia F. Cannella to Robert G. Schuler, Esq., Kegler, Brown, Hill & Ritter regarding iseekit.com, Jul. 1, 1999, 2 pages.
Coursey, David "Coursey.com", Mar. 1998, 2 pages.
Database of Corporate ResourceNet, "Bits", from Adweek-Eastern Edition, vol. 40, Issue 14, Apr. 1999, printed from the Internet at: <wysiwyg://bodyframe.3.http://ehost... 22%20and%20search%2a%20&fuzzyTerm=>, 2 pages.
Database of Corporate ResourceNet, "Capitalist Tool", Time Canada, vol. 151, Issue 8. Mar. 1998, printed from the Internet at: <http://time.qpass.com/time/magazine/article/qpass/item. 0,10987,,00html?QProd-1&QIID=1...,1 page.
Database of Corporate ResourceNet, "Goto.com Chooses Quest's SharePlex(R) for Oracle Software to Ensure Uptime for Business-Critical Web Site", PR Newswire, Jun. 2000, printed from the Internet at: <wysiwyg://bodyframe.3.http://ehost... anTerm=%22GOTO%2eCOM%22&fuzzyTerm=>, 2 pages.
Database of Corporate ResourceNet, "New Service Puts an Auction Search Engine Under One Roof", Electronic Advertising & Marketplace Report, vol. 12, Issue 8, Apr. 1998, printed from the Internet at: <wysiwyg://bodyframe.3/http://ehost...an Term=%22GOTO%2eCOM%22&fuzzyTerm=>, 2 pages.
Database of Corporate ResourceNet, "New services Aim to Boost Efficiency of Search Engines", Electronic Advertising & Marketplace Report, vol. 12, Issue 13, Jun. 1998, printed from the Internet at: <wysiwyg://bodyframe.3.http://ehost... 22%20and%20search%2a%20&fuzzyTerm=>, 2 pages.
Database of DialogClassic(m), :Homestead Technologies' Continued Success Draws $17.50 Million in second Round of Venture Funding, PR Newswire, Apr. 1999, 2 pages.
Dawson et al., "2 Search Sites Narrow Their Parameters", Adweek-Western Edition, vol. 48, Issue 42, Oct. 1998, printed from the Internet at: <wysiwyg://bodyframe.3.http://ehost... 22%20and%20search%2a%20&fuzzyTerm=>, 2 pages.
Doran, David, "Search Engines . . . Their popularity, their secrets, their flaws", Entrepreneur, Jul. 1998, p. 18.
DoubleClick Frequently Asked Questions, obtained at the internet address: http://web.archive.org/web/19980205033925/www.doubleclick.com/nf/adinfo/facts.htm, dated Oct. 16, 2002, 5 pages.
DoubleClick TestIt?, obtained at the internet address: http://web.archive.org/web/19980205034316/www.doubleclick.com/nf/adinfo/testiset.htm, dated Oct. 16, 2002, 4 pages.
Dumais, Susan et al., "Optimizing Search by Showing Results in Context", *CHI 2001*, vol. No. 3, Issue No. 1, Mar. 31-Apr. 5, 2001, pp. 277-284.
ebrandmanagement.com, "The Classification of Search Engine Spamming" Proceedings of Search Engine Strategies, Mar. 4-5, 2002, Boston, MA, organizer Danny Sullivan.
Espe, "Online Search Engines Start to Charge for Listings", Washington Business Journal, vol. 18, Issue 1, May 1999, printed from the Internet at: <wysiwyg://bodyframe.3/http://ehost...22%20and%20search%2a%20&fuzzyTerm=>, 3 pages.
Fisher, Sara "Budding Internet Firm Finds Niche in Satisfaction", L.A. Business Journal, Aug. 10, 1998, 1 page.
Flynn, Laurie J. "With GoTo.com's Search Engine, The Highest Bidder Shall Be Ranked First", The New York Times, Business Day, Mar. 1998, 1 page.
Fretzen, Jeff "Help for Getting the Word Out About Web Sites", PC Week, Vo. 14, No. 46, Nov. 3, 1997, p. 27(1), 3 pages.
Full Catalog—Categories Menu, Sun Microsystems Sun Solutions Catalog, obtained at the internet address: http://web.archive.org/web/19981205110211/solutions.sun.com/catalogs/all/index.htm, printed on Dec. 19, 2002, 2 pages.
G. David Doran, "Pay to Play", Entrepreneur, Jul. 1998, 1 page.

Galore—Super Search Engine, May 21, 1999, printed from the Internet at: http://www.galore.com/1/mainframe.shtml, 7 pages.
Glaser, Ken "Who Will GoTo.com", from OnlinePress.com, printed from the Internet, Feb. 1998, 2 pages.
Google Search, communication from Jeffrey Brewer at Jeffrey@goto.com, titled "Need reverse stemming software", dated May 27, 1998, obtained at the internet address: http://groups.google.com/groups?selm=356CEE4A8DE882A8%40goto.com, on Dec. 19, 2002, 1 page.
GoTo.com, circa 1998, printed from the Internet at: www.goto.com/d/search-results/html, Aug. 1998 5 pages.
Hansell, Saul "Alta Vista Invites Advertisers to Pay for Top Ranking", The New York Times, Apr. 15, 1999, 1 page.
Help on Making Queries—Search by Company or Product, obtained at the internet address: http://web.archive.org/web/19981203050002/solutions.sun.com/search-help.htm, printed on Dec. 19, 2002, 4 pages.
Hilty, Wyn "GoTo.Hell—What Happens When On Line Search Engine Accepts Cash From Web Sites?" printed from the Internet at: http://www.ocweekly.com/link/archives/97/27/byte-3.11.98-1.html, Mar. 1998, 3 pages.
hitsgalore.com Search Engine, May 21, 1999, printed from the Internet at: http://www.hitsgalore.com. 8 pages.
I Seek It "The Next Generation Search Engine", May 21, 1999, printed from the Internet at: http://www.iseekit.com, 6 pages.
IBM Technical Disclosure Bulletin, "Organizing a Ranked List of Search Matches", Nov. 1994, printed form the Internet at: http//westbrs:8820/bin/gate.exe?f...PTFFull&p-doc-3=&p-doc-4=, 2 pages.
Ketchpel, Steven P. et al. "U-PAI: A Universal Payment Application Interface", conference material article from the Second USENIX Workshop on Electronic Commerce Proceedings, Oakland, California, Nov. 18-21, 1996, 17 pages.
Kieinberg, Jon et al., "Applications of Linear Algebra in Information Retrieval and Hypertext Analysis", Department of Computer Science, Cornell University, copyrighted 1999, pp. 185-193.
Komando, "Searching for Search Engines—from Dogpile to Deja News", Business First-Colombus, vol. 14, Issue 43, Jun. 1998, printed from the Internet at: <wysiwyg://bodyframe.3.http://ehost... 22%20and%20search%2a%20&fuzzyTerm=>, 2 pages.
Komando, Kim "With About 320 Million Sites, Search Engines Offer Some Help", copyright 1998, Los Angeles Times Syndication, 1 page.
Kramer, Ralf et al., "Thesaurus federations: loosely integrated thesauri for document retrieval in networks based on Internet technologies", Int. J. Digit Libr, 1997, pp. 122-131.
Lash, Alex CNET News.com, Dec. 11, 1996, "Open Text Updates Tools", printed from the Internet at: http://www.news.com/News/Item/0,4,6118,00.html, Jun. 29, 1999, 3 pages.
Li, Yanhong, *Toward a Qualitative Search Engine*, IEEE Internet Computing, http://computer.org/internet, pp. 24-29, Jul.-Aug. 1998.
Mardesic, Jodi "Search Engine Charges Hit Sites", printed from the Internet at: http://www.sjmercury.com/business/center/goti022198.html, Feb. 1998, 2 pages.
Mardesich, Jodi "Web Site Operators Pay for Top Billing", The News—Herald (Willoughby, OH), Mar. 2, 1998, 2 pages.
Mardesich, Jodi "Web Site Operators Pay for Top Billing-Search Engine Allows Site Sponsors to Buy Place on Special List", from Knight Ridder Newspapers, Mar. 1998, 2 pages.
Margot Williams, "How to Ease Your Online Searches", Lansing State Journal, Jun. 1, 1998, 1 page.
Matsuda, Katsushi et al., "Task-Oriented World Wide Web Retrieval by Document Type Classification", *Human Media Res. Labs, NEC*, copyrighted Nov. 1999, pp. 109-113.
McWilliams, Brian "Search Engine to Sell Top Positions on Results Lists", PC World Online, Feb. 23, 1998, printed from the Internet at: http://www.pcworld.com/news/daily/data/0298/....html, 1 page.
McWilliams, Brian PC World Online, Feb. 23, 1998, "Search Engine to Sell Top Positions on Results Lists", printed from the Internet address http://www.pcworld.com/news/daily/data/0298/9880223173204.html, Feb. 1998, 1 page.

Miller, Karen L., "Improve Your Ranking (Building Web Sites to Attract Web Searches)", Home Office Computer, vol. 16, No. 1, Jan, 1998, p. 51(2), 3 pages.

News of the Week articles, Telephony, May 1, 1995, pp. 8 and 10.

Northern Light, printed from the Internet at: www.sirocco.northernlight.com, Jun. 1998, 11 pages.

Nuts 'N Bolts articles, Target Marketing, Oct. 1997, 1 page.

Online Updating, Sun Microsystems Sun Solutions Catalog obtained at the internet address: http://web.archive.org/web/19990220190636/solutions.sun.com/editmodule/help.html, printed on Dec. 19, 2002, 2 pages.

Pelline, Jeff "New Search Engine Goes Commercial", CNET News.com, printed from the Internet at: http://www.news.com/News/Item/0,4,19281,00.html, Feb. 20, 1998, 2 pages.

Pelline, Jeff "Pay-for-placement gets another shot", printed from the Internet at: http://www.newscom./news/item/0,4,19307,00.html, Sep. 1997.

Pirolli, Peter et al., "Silk From A Sow's Ear: Extracting Usable Structures From the Web", Xerox Palo Alto Research Center, *CHI 96*, Apr. 13-18, 1996, pp. 118-125.

Press Release article titled "GoTo.com Announces First round of Financing, Totaling More Than $6 Million, Led by Draper, Fisher Jurvetson", *Business Wire*, dated May 19, 1998, retrieved from the Internet at <http://www.dialogclassic.com/main.vingw> on Nov. 9, 2000, 2 pages.

Press release,"Netscape Announces Netscape Directory Server to Deliver Open, Cross-Platform LDAP-Based Directory Services for Locating Online Users and Resources," Apr. 1996, printed from the Internet at: http:/home.netscape.com/newsref/pr/newsrelease126.html. 3 pages.

Rich, Laura "New Search Engine Allows Sites to Pay Their Way to Top", printed form the Inter at: http://www.adweek.com/iq/iqnews02.asp, Feb. 1998, 1 page.

Rich, Laura Adweek Online IQ News Online, Feb. 23, 1998, "New Search Engine Allows Sites to Pay Their Way to Top", printed from the Internet at: http://www.adweek.com/iq/ ignews02.asp, Feb. 23, 1998, 1 page.

Riedman, Patricia "Search Engine Startup to Auction Listings", Advertising Age Magazine, Feb. 23, 1998, 1 page.

Sasha Alyson, "Searching the Search Engines", Front Page, May 8, 1998, 1 page.

Schwartz, Randal L., "Click-Through Tracking in Perl", Web Techniques, dated May 1998, located at the internet address: www.webtechniques.com, 3 pages.

Search Engine Watch, Feb. 21, 1998, "GoTo Sells Positions", printed from the Internet address http://www.searchenginewatch.com/news.html, Feb. 23, 1998, 2 pages.

Search Report from corresponding European Application No. 03253259, dated Apr. 26, 2005, 2 pages.

SearchUP.com—Internet Directory, Automated Bid Placement System, printed from the Internet at: http://www.searchup.com/search.cfm, Aug. 25, 1999, 3 pages.

SearchUP: URL Position Manager, printed from the Internet at: https://www.securearea.net/searchup/login.cfm, Aug. 25, 1999, 1 page.

SearchUP: URL Position Manager, printed from the Internet at: https://www.securearea.net/searchup/newaccount.cfm, Aug. 25, 1999, 4 pages.

SearchUP: URL Position Manager, printed from the Internet at: https://www.securearea.net/searchup/addurl.cfm, Aug. 25, 1999, 5 pages.

Smith, Laura B., article "Going . . . Gone", PC Week, vol. 13, No. 34, dated Aug. 26, 1996, p. E1 (2), printed from the Internet at: http://www.dialog-classic.com/DialogClassic/dialog, 4 pages.

Sullivan, Danny, "Search Engine Spamming" INT Media Group, Inc., Jan. 22, 2002, *Search Engine Watch*, retrieved from the Internet, <http://searchenginewatch.com/>, 3 pages.

Sullivan, Danny, "White Paper: The Classification of Search Engine Spam", INT Media Group, Inc., 2002, retrieved from the Internet at <http://www.ebrandmanagement.com/whitepapers/spam-classification/> on Feb. 18, 2002, 10 pages.

Sullivan, Danny, "GoTo Sells Positions", The Search Engine Report, dated Mar. 3, 1998, 4 pages.

Supplementary Search Report for corresponding European Patent Application No. EP 00 936393, dated Feb. 20, 2004, 3 pages.

Swartz, Jon—San Francisco Chronicle, Feb. 23, 1998, "Browser Only Lists Paying Web Sites Critics Fear Approach Will Squeeze Out Most Small Internet Players", printed from the Internet address http://www.sfgate.com/cgi-bin/arti...le/archive/1998/02/21/BU102470.DTL, Fe, 1998, 1 page.

Swartz, Jon "Browser Only Lists Paying Web Sites Critics Fear Approach Will Squeeze Out Most Small Internet Players", publish on San Francisco Chronicle, Feb. 1998, printed from the Internet at: http://www.sfgate.com/cgi-bin/article.cgi?file=/chronicle/archive/1998/02/21/BU102470.DTL, 3 pages.

Van Roeden, Adriaan, "Your Own Search Engine With SWISH, A Custom Search Facility for Your Web Site", Web Techniques, dated Nov. 1996, located at the internet address: www.webtechniques.com, pp. 63-66 pages.

Vonder Haar, Steven ZDNet,com, Inter@ctive Week Feb. 19, 1998, "Searching for the Highest Bidder", printed from the Internet at: http://www.zdnet.com/intweek/daily/9802191.html, Feb. 23, 1998, 2 pages.

Wang, Nelson "Engines Battle Irrelevance of Results—New Search Service Hope to Fill the Void", by Internet World, printed from the Internet at: http://www.internetworld.com/print/current/news/19980223-battle.html, Feb. 1998, 3 pages.

Wingfield, Nick CNET News.com, Jun. 21, 1996, "Engine Sells Results, Draws Fire", printed from the Internet at: http://www.news.com/News/Item/Textonly/0,25,1635,00. html, Jul. 29, 1999, 2 pages.

Wingfield, Nick CNET News.com, May 22, 1996, "Another Engine Takes Ads by the Click", printed from the Internet at: http://www.news.com/News/Item/0,4,1387,00.html, Jul. 29, 1999, 2 pages.

Wingfiled, Nick, "Another Engine Takes Ads by the Click", printed from the Internet at: http://www.news.com/News/Item/0.4.1387,00/html, May 1996, 3 pages.

Teru Agata et al., Automatic Classification of World Wide Web Pages, 10pgs., The Journal of the Institute of Electronics, Information and Communication Engineers, vol. 82, No. 12, Dec. 1999.

M. Sato et al., Technical Survey, The Institute of Electronics, Information and Communication Engineers, 7pgs., vol. 82, No. 12, Dec. 1999.

Wingfield, Nick, "Engine Sells Results, Draws Fire," retrieved from http://www.news.com/News/Item/0,4,1635,00.html, 2 pages (Jun. 21, 1996).

Office Action in related U.S. Appl. No. 11/413,627, dated Dec. 7, 2009 (17 pages).

Wikipedia, "Google search," retrieved from http://en.wikipedia.org/wiki/Google_search, 12 pages (Apr. 12, 2010).

Wikipedia, "PageRank," retrieved from http://en.wikipedia.org/wiki/PageRank, 15 pages (Apr. 12, 2010).

\* cited by examiner

FIG 9C

YAHOO! search
commercial filtering demo

314 — Search Results
shopping ◄——●——► researching
        neutral
312    316

Web  Images  Directory  Yellow Pages  News  Products
Search: ○ the Web  ● just pages in English    [Search]
flowers
This is a Yahoo! Research Labs demo. Each query may take a minute or more to process. Send your questions, comments, or bug report to Scott Kline.
Shortcuts  Advanced Search  Preferences
Results 1-20 of about 34,500,000 for flowers. Search took 0.07 seconds (About this page...)
                    ↙ 310

1. Flowers - Quotes and Poems for Gardeners (1)
   Quotes for Those that Love, Gardens, Gardening, and the 'Green Way. Complied by Michael P. Garofalo. A flower's fragrance declares to all the world that it is fertile, available and desirable, its sex organs oozing with nectar... elevating and refining influences and moral value of flowers with all their graceful forms, bewitching shades and...
   www.gardendigest.com - Cached - More pages from this site 2. Edible Flowers -List of Edible Flowers with photos, descriptions, and recipes
   Learn how to use edible flowers in your cooking from What's Cooking America...Most herb flowers have a taste that's similar to the leaf, but spicier. The concept of using fresh edible flowers in cooking is not new...
   www.whatscookingamerica.net - Cached - More pages from this site 3. Flowers for Al and Don
   Welcome to Flowers for Al and Don. On the afternoon of Thursday Feb. 19, on Boing Boing, I read about this great idea...Basically, people are generously sending flowers to random gay couples waiting in line to get married in... charge about US $45 to deliver these flowers. That's probably market value ...
   www.darrenbarefoot.com - Cached - More pages from this site 4. Wildflowers
   The Wildflowers page provides links to native plant forums, events on wildflowers, catalogs... Send Fresh Flowers! From $29.95!...
   www.wild-flowers.com - Cached - More pages from this site 5. twin_cities: Flowers
   Current mood: ecstatic. Flowers. Today a coworker of mine had a thought to send flowers to a random couple waiting in line at SF city hall. He called a florist and they agreed to do it.
   www.livejournal.com - Cached - More pages from this site 6. Open Directory - Shopping: Flowers
   the entire directory only in Shopping/Flowers.  See also:  This category in other languages: "Flowers" search on: dmoz.org - Cached - More pages from this site 7. FarmhouseFlowers2001
   FARMHOUSE , FLOWERS & PLANTS, FARMHOUSE FLOWERS & PLANTS.  4501 Gregg Road Brookeville, MD 20833 (301) 963-5044.  CUT FLOWER GROWERS...family since the early 1940's.  Farmhouse Flowers & Plants has grown from a small cutting...At Farmhouse Flowers & Plants we grow over 75 different varieties of flowers for

SPONSOR RESULTS

1800FLOWERS.COM - Send Flowers and More
Same-day local and nationwide delivery lets you send fresh flowers in a hurry. With bouquets from $24.99, you'll find the perfect gift at one of the world's largest florists.
www.1800flowers.com Quality Flowers - FTD.COM
Official Site
Celebrate all occasions with fresh flowers and gifts from FTD.COM Same-day delivery available.
www.ftd.com Send Flowers from $24.99
1 ranked Flower site by Money.com. Proflowers saves you 30-50% off retail prices. We ship direct from the grower for lasting quality and have an industry-leading 7 day freshness guarantee.
www.proflowers.com Buy High End Flowers Online
At Butterfield Blooms, we specialize in distinctive floral designs. Choose from inspired collections and bouquets, browse by flower type or occasion. Nationwide delivery.
www.butterfieldblooms.com See your message here...

COMMERCIAL FILTERING - INDENTED

SLIDER THRESHOLD = -0.3      336

334
1. Jaguar Cars
Jaguar Cars..
Category: Auto Makers > Jaguar
score = "0.089104"
338
www.jaguar.com - Cached - More pages from this site.

2. Jaguar Cars
www.jaguar.com.
score = "-0.119201"
www.jaguarcars.com - Cached - More pages from this site 3. http://www.jaguar-racing.com/Category: Current F1 Teams > Jaguar Racing
score = "-0.035943"
www.jaguar-racing.com - Cached - More pages from this site

4. Apple - Mac OS X
Security Update 2004-08-09: Delivers a number of security enhancements recommended for everyone. Mac OS X has evolved...quantify that as up to six times faster than Jaguar, but you'll probably think Panther's done almost before you stop...
score = "-0.330617"
www.apple.com - Cached - More pages from this site 5. Jaguar Cars.
X-TYPES-TYPEXJXKR PerformancePre-OwnedQuality ServicesCompanyLocate a Retailer. Home. Jaguar Tools. Build your Jaguar. Finance your Jaguar. Locate a Retailer. Request a Brochure. The newly restyled 2005 S-Type has arrived
...Subscribe to Jaguar in Form for exclusive news and special offers...
score="0.190587"
www.usjaguar.com - Cached - More pages from this site 6. Jaguar - racing.com
Site dedicated to the Jaguar Formula 1 team. News, pictures, team
score = "-0.035943"
www.jaguar-racing.com - Cached - More pages from this site

7. Schrödinger: Jaguar Program
Extremely fast ab initio electronic structure package. Jaguar was designed to increase the speed of ab initio calculations in order to accelerate basic and applied research projects and to enable calculations at a higher level of theory... Programs. Glide. Jaguar. Liasison. LigPrep. MacroModel.Maestro.Mopac2002...
score="-1.000207"
www.psgvb.com - Cached - More pages from this site

FIG 10

METHOD AND APPARATUS FOR CATEGORIZING AND PRESENTING DOCUMENTS OF A DISTRIBUTED DATABASE

RELATED APPLICATIONS

The present patent document is a continuation-in-part of application Ser. No. 10/155,290 filed May 24, 2002, now U.S. Pat. No. 7,231,395, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright© 2005, Overture Services, Inc., All Rights Reserved.

BACKGROUND

The transfer of information over computer networks has become an increasingly important means by which institutions, corporations, and individuals do business. Computer networks have grown over the years from independent and isolated entities established to serve the needs of a single group into vast internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end supercomputers, are connected to the Internet.

The Internet has emerged as a large community of electronically connected users located around the world who readily and regularly exchange vast amounts of information. The Internet continues to serve its original purposes of providing for access to and exchange of information among government agencies, laboratories, and universities for research and education. In addition, the Internet has evolved to serve a variety of interests and forums that extend beyond its original goals. In particular, the Internet is rapidly transforming into a global electronic marketplace of goods and services as well as of ideas and information.

This transformation of the Internet into a global marketplace was driven in large part by the introduction of common protocols such as HTTP (HyperText Transfer Protocol) and TCP/IP (Transmission Control Protocol/Internet Protocol) for facilitating the easy publishing and exchange of information. The Internet is thus a unique distributed database designed to give wide access to a large universe of documents published from an unlimited number of users and sources. The database records of the Internet are in the form of documents known as "pages" or collections of pages known as "sites." Pages and sites reside on servers and are accessible via the common protocols. The Internet is therefore a vast database of information dispersed across seemingly countless individual computer systems that is constantly changing and has no centralized organization.

Computers connected to the Internet may access pages via a program known as a browser, which has a powerful, simple-to-learn user interface, typically graphical and enables every computer connected to the Internet to be both a publisher and consumer of information. Another powerful technique enabled by browsers are known as hyperlinking, which permits page authors to create links to other pages that users can then retrieve by using simple commands, for example pointing and clicking within the browser. Thus each page exists within a nexus of semantically related pages because each page can be both a target and a source for hyperlinking, and this connectivity can be captured to some extent by mapping and comparing how those hyperlinks interrelate. In addition, the pages may be constructed in any one of a variety of syntaxes, such as Hyper Text Markup Language (HTML) or eXstensible Markup Language (XML), and may include multimedia information content such as graphics, audio, and still and moving pictures.

Because any person with a computer and a connection to the Internet may publish their own page on the Internet as well as access any other publicly available page, the Internet enables a many-to-many model of information production and consumption that is not possible or practical in the offline world. Effective search services, including search engines, are an important part of the many-to-many model, enabling information consumers to rapidly and reliably identify relevant pages among a mass of irrelevant yet similar pages. Because of the many-to-many model, a presence on the Internet has the capability to introduce a worldwide base of consumers to businesses, individuals, and institutions seeking to advertise their products and services to consumers who are potential customers. Furthermore, the ever increasing sophistication in the design of pages, made possible by the exponential increase in data transmission rates, computer processing speeds and browser functionality makes the Internet an increasingly attractive medium for facilitating and conducting commercial transactions as well as advertising and enabling such transactions. Because the Internet allows direct identification of and connection between businesses and targeted consumers, it has the potential to be a powerfully effective advertising medium.

The availability of powerful new tools that facilitate the development and distribution of Internet content (this includes information of any kind, in any form or format) has led to a proliferation of information, products, and services offered through the Internet and a dramatic growth in the number and types of consumers using the Internet. International Data Corporation, commonly referred to as IDC, has estimated that the number of Internet users will grow to approximately 320 million worldwide by the end of 2002. In addition, commerce conducted over the Internet has grown and is expected to grow dramatically. IDC estimates that the percentage of Internet users buying goods and services on the Internet will increase to approximately 40% in 2002, and that the total value of goods and services purchased over the Internet will increase to approximately $425.7 billion.

Thus, the Internet has emerged as an attractive new medium for advertisers of information, products and services ("advertisers") to reach not only consumers in general, but also to enable increased capabilities to identify and target specific groups of consumers based on their preferences, characteristics or behaviors. However, the Internet is composed of an unlimited number of sites dispersed across millions of different computer systems all over the world, and so advertisers face the daunting task of locating and targeting the specific groups or subgroups of consumers who are potentially interested in their information, products and/or services.

Advertisers, rely on search services to help consumers locate the advertisers' sites. Search services, including directories and search engines, have been developed to index and search the information available on the Internet and thereby help users, including consumers, locate information, products and services of interest. These search services enable users, including consumers, to search the Internet for a listing of sites based on a specific keyword topic, product, or service of interest as described by the users in their own language. Because search services are the most frequently used tool on the Internet after email, sites providing search services offer advertisers significant reach into the Internet audience and create the opportunity to target consumer interests based on keyword or topical search requests.

Search services are generally created by search engine providers who electronically review the pages of the Internet and create an index and database based on that review. The search engine providers may offer the search services directly to consumers or may provide the search services to a third party who then provides the search services to consumers. Usually, the databases are created either by crawling the Internet and making a local copy of every page or aspect thereof into a memory device, or by collecting submissions from the providers of the pages (the "Resulting Pages"). This can include static and/or dynamic content, whether text, image, audio, video or still images. Alternatively, only certain aspects of the pages may be copied such as the URL, title or text. Each Resulting Page is indexed for later reference. Thus when a search of the Internet is requested by a user, the search engine does not actually search the Internet in real-time, but rather searches its own index and database for the relevant Resulting Pages ("search results" or "listings"). The search results are then presented to the user as either copies of the actual pages or a listing of pages that may be accessed via hyperlink.

Many known search engines use automated search technology to catalog search results which generally rely on invisible site descriptions known as "meta tags" that are authored by site promoters. Because advertisers may freely tag or have tagged their sites as they choose, many pages are given similar meta-tags, which increase the difficulty of providing relevant search results. In addition, most known search engines rely on their own hierarchy of semantic categories into which indexed pages are categorized. This is a top-down categorization approach where the categories are semantically related irrespective of their commercial or non-commercial nature. Therefore, known search engines do not provide a bottom-up, customizable categorization of search result based upon the page or site's commercial nature and relevance.

Additionally, some advertisers and other site promoters insert popular search terms into their site's meta tags which are not relevant to their pages so that these pages may attract additional consumer attention at little to no marginal cost. Such pages yield many undesirable results and are referred to as "spam pages." Generally, pages are referred to as "spam" if they include some mechanism for the purpose of deceiving search engines and/or relevance ordering algorithms and may also redirect users towards sites that are not relevant to the user's original search. Many such mechanisms and techniques exist and include, but are not limited to including meta tags that do not reflect the true nature of the page. Usually, spam pages are commercial in nature. That is, they attempt to sell something to users.

Many known search engines are simply not equipped to prioritize results in accordance with consumers' preferences. Known search engines also do not provide any way to determine whether each page in a listing is commercial in nature and to categorize the listing on the basis of the commercial nature of each page. When this is done, the search results can be processed to provide a more useful organization according to the consumer's intent (whether it be to carry out a commercial transaction or to seek information) in initiating the search. For example, a consumer seeking information on a given topic may wish to distinguish pages that are primarily informational in nature from pages that are primarily commercial in nature. In another example, a consumer may wish to distinguish pages that are primarily commercial in nature and relevant to the consumer's request, from unwanted or spam pages.

Moreover, in known search engines, a consumer attempting to locate a site for purchasing goods or services will also be presented with a vast number of sites that might relate to the item but do not facilitate the purchase of that item. Likewise, consumers interested only in locating informational sites for an item will also be presented with many commercial sites for purchasing the item that may not provide the information they are seeking. Therefore, the consumer's desired result pages are hidden among large numbers of pages that do not correspond with the consumer's ultimate goal because known search engines are not able to distinguish either the consumer's intent for the search nor the commercial or non-commercial nature of the search results.

Thus, the known search engines do not provide an effective means for users to categorize the type of search results for which they are looking, informational or commercial, or for advertisers seeking to control their exposure and target their distribution of information to interested consumers. Current paradigms for presenting search results make no page by page distinction between informational and commercial sources of information, and instead mix both types of results depending purely on the relevance assigned to them as responses to the user's original search query.

Known methods used by advertisers to control their exposure and target their distribution, such as banner advertising, follow traditional advertising paradigms and fail to utilize the unique attributes of the Internet's many-to-many publishing model. Furthermore, to the extent that banner ads are found in the search results, they often fail to attract consumer interest because the consumer is looking in a directed manner for search results on that page, not for a banner.

Thus, the traditional paradigms relating to Internet advertising and search engines fail to effectively categorize and deliver relevant information to interested parties in a timely and cost-effective manner. Therefore, consumers must manually sort through all search results to ultimately locate the type of results (commercial or non-commercial) in which they are interested. Because Internet advertising can, however, offer a level of targetability, interactivity, and measurability not generally available in other media, the ability to categorize and clearly present identified sets of commercial and non-commercial results increases consumer satisfaction and facilitates increased economic efficiency by reducing the amount of manual sorting required of users.

Ideally, advertisers should be able to improve their visibility in an Internet search results list so that their pages not only appear prominently in the listing but are not masked by a multitude of other non-commercial pages (see U.S. Pat. No. 6,269,361, incorporated herein by reference). Likewise, consumers should be able to have their search results reliably categorized and clearly presented as either informational or commercial. Without a reliable means to distinguish between commercial and non-commercial pages, known search engines cannot exploit the true potential of the targeted market approach made possible by the Internet.

Thus, the search engine functionality of the Internet needs to be focused in a new direction to facilitate an online marketplace which offers consumers quick, relevant and customizable search results while simultaneously providing advertisers with a reliable, verifiable and cost-effective way to target consumers and position the advertisers' products and services within a listing. A consumer utilizing a search engine that facilitates this on-line marketplace will find companies or businesses that offer the products or services that the consumer is seeking without the distraction of non-commercial pages. Additionally, while the user is seeking strictly informational resources, the user will not be bothered by spam pages or irrelevant commercial pages.

It is therefore an object of the present invention to provide a system and method for examining and categorizing records in a distributed database as commercial or non-commercial records and then presenting those records in response to a database query submitted by a user or network-defined settings.

It is also an object of this invention is to provide users with a customizable search engine that permits users to organize search results listings based upon the commercial nature of the search result and to allow users to specify presentation rules based upon categories and user preferences.

A further object of this invention is to provide search engine service customers with a customizable search engine that permits each search engine service customer to organize search results listings based upon the commercial nature of the search result and to allow the search engine service customer to specify presentation rules for the search results based upon categories and search engine service customer preferences.

It is also an object of the present invention is to provide a system and method for enabling search engine service providers or users to dynamically specify the importance of various transactional criteria and threshold values in order to create a flexible scale of value based on the commercial nature of a record in order to assign a transactional rating and therefore a commercial or non-commercial designation for each record.

A further object of the present invention is to provide a system and method for categorizing and presenting search results by combining a transactional rating with a quality score and a spam score in order to assign a commercial score and then rank or classify such results according to such score.

It is also an object of the present invention to provide a system and method for categorizing documents in a distributed database to create categorized documents by initially assuming all documents are non-commercial, filtering out all commercial documents and placing them in a first category and using the first category as a collection of advertiser prospects for a pay for performance search engine.

A further object of the present invention is to provide a cost-effective system and method for managing the operation of a pay for performance search engine by automatically generating advertiser sales leads by initially categorizing pages as commercial or non-commercial and then further categorizing commercial pages as existing customers or sales leads.

A further object of the present invention is to provide a system and method for categorizing records in a distributed database to identify commercial records and compare those records against a pay for performance search engine's listings in order to further categorize commercial records as either participating advertisers or non-participating advertisers.

A still further object of the present invention is to provide a system and method of sales lead generation for pay for performance search engine advertisers by organizing and presenting non-participating commercial records to a pay for performance search engine sales staff according to dynamically specified criteria.

BRIEF DESCRIPTION

A method for providing search results to a user is disclosed. The method includes receiving a first set of information associated with a plurality of web pages. A second set of information associated with a user preference, determining a commercial score for each web page is also received. A subset of the first set of information is determined based on the second set of information. A visual indicator for the subset of the first set of information is generated in accordance with a commercial score, and the subset and the visual indicator are displayed on a display.

A further method for providing search results to a user is also disclosed. A user interface is provided to collect a user input. A user preference object capable of being set by the user to a plurality of values is also provided. A search result is displayed in accordance with the user input and a user selected value from the plurality of values of the user preference object.

Also described herein is a user interface for providing search results to a user. The user interface includes a first graphical user interface object for receiving a keyword from the user. The user interface also includes a second graphical user interface object for receiving a user preference from the user, the user preference indicative of a desire to view a determined mix of commercial and non-commercial results. A display area for displaying search results associated with a plurality of web pages to a user is also included, wherein the search results are displayed in response to either receiving the keyword or the user preference.

The system provides numerous embodiments that will be understood by those skilled in the art based on the present disclosure. Some of these are described below and are represented in the drawings by means of several figures, in which:

BRIEF DESCRIPTION OF SEVERAL VIEWS OF THE DRAWINGS

FIGS. 9A-C are exemplary screenshots of a user interface.

FIG. 10 is another exemplary screenshot of a user interface.

DETAILED DESCRIPTION

Figure 1A:
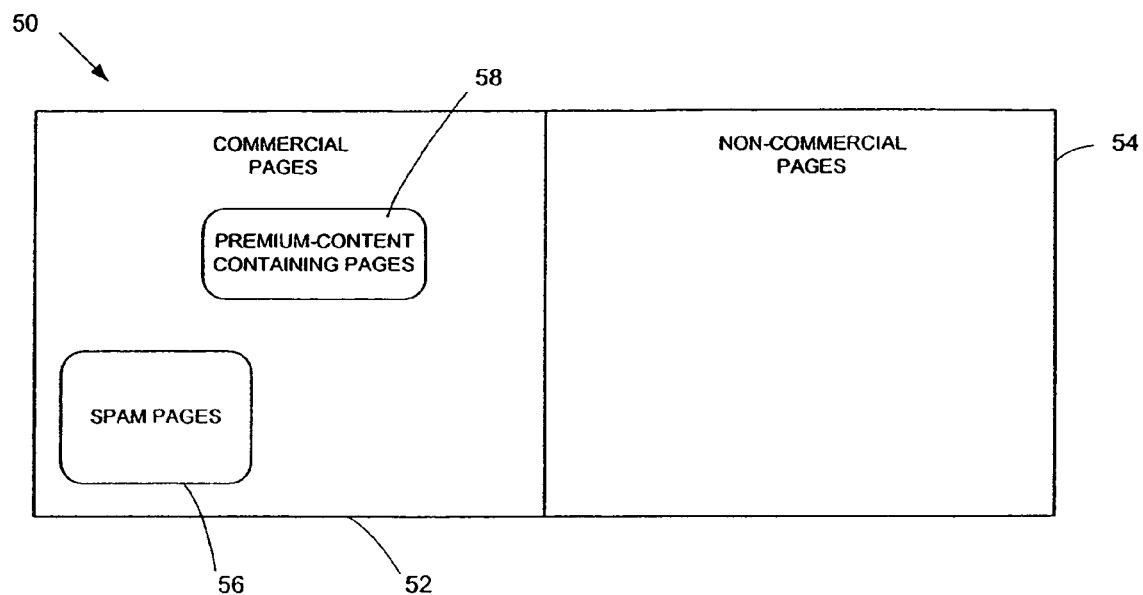
FIG. 1A is a block diagram of page categorization, according to an embodiment of the present invention.

Described herein is a method and apparatus for identifying documents in a distributed database. One embodiment comprises a heuristic for identifying pages that are commercial in nature and providing a system and method for the dynamic categorization and presentation of both commercial pages and informational pages in real-time to an advertiser, search engine provider or user. This system may be used in any context where it is useful to categorize search results based upon the commercial nature of those pages, and can be utilized in a multitude of forms from a browser plug-in to a stand-alone application to a back-end search-engine or search engine tool. In addition, the system can be used to provide unique operational benefits to a pay for performance search engine provider by automating a portion of the sales cycle and enabling a collaborative account management environment between advertisers and a the pay for performance search engine provider.

Distinct sets of search results for commercial pages and informational pages returned in response to a user-defined query, are provided to advertisers, search engine service providers and users. The system distinguishes pages according to the commercial nature of each page, and thereby provides more relevant results by providing relevant search results to those users seeking information or to enter into a commercial transaction, without confusing the two categories of search results. The system also enables complete customization with regard to the set of criteria used to categorize search results, the importance of each such criterium in the determination of such categorization, and the ultimate categorization and presentation of such search results to the user.

Methods and apparatuses for statically and dynamically categorizing and presenting the records of a distributed database are disclosed. Descriptions of specific embodiments are provided only as examples, and various modifications will be readily apparent to those skilled in the art and are not intended to be limited to the embodiments described. Identical features are marked with identical reference symbols in the indicated drawings.

Described herein is a customizable system for identifying and categorizing the records in or the results of a search of the records in a distributed database, and for categorizing and presenting the records or search results according to the commercial nature of the record in a more organized, more easily understood, and therefore, more useful manner. The following descriptions detail how the pages of or the results of a search of the Internet may be identified and categorized as commercial and non-commercial (informational), but it is readily understood that the records of a distributed database, including the Internet, may be categorized into a limitless variety of categories, including sub-categories of the commercial and non-commercial categories. Other categories may include on-line shopping and advertisements for traditional stores and services. Alternatively, or additionally, the records in or the search results of the records in a distributed database may be categorized and presented geographically, via price range, and by many other criteria according to a variety of user-specified variables. Additionally, the methods disclosed herein may be used across any distributed database coupled in any manner to any kind of network including Local Area Networks (LAN) and Wide Area Networks (WAN), and not just the Internet.

Figure 1B:
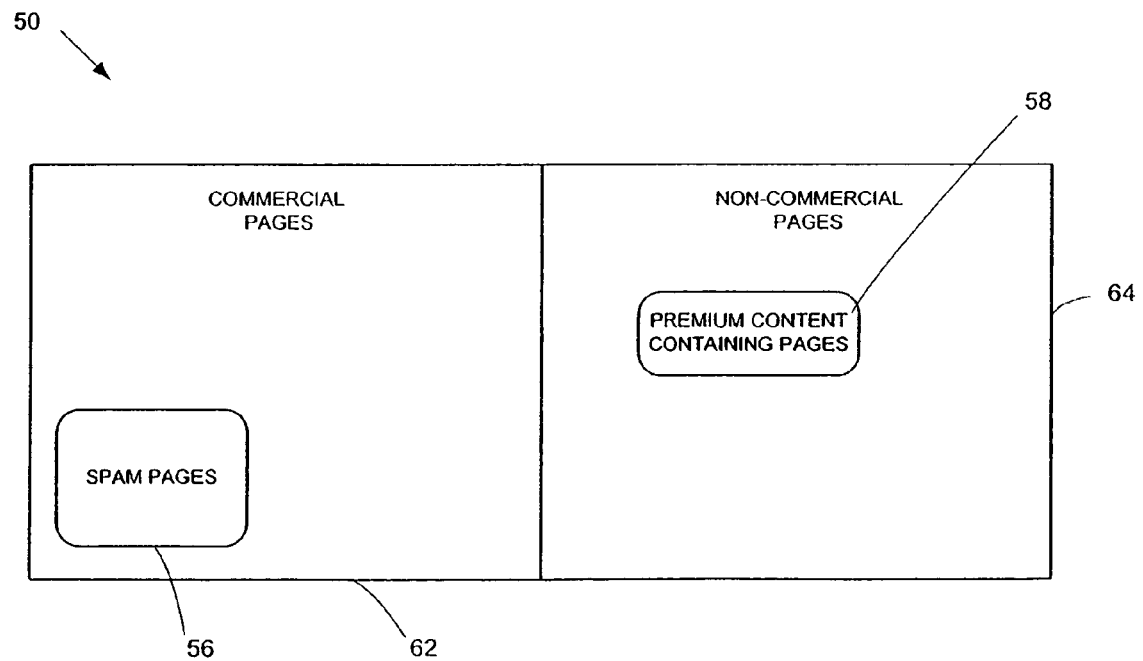
FIG. 1B is a is a block diagram of page categorization, according to another embodiment of the present invention.

Referring now to the drawings, FIGS. 1A and 1B show how the search results of a search of the Internet can be categorized. A search of the Internet is actually a search of a database of the contents of the Internet that can be generated through the use of a crawler. The crawler crawls the Internet and saves to a local database either a duplicate of each page found or a duplicate of a portion thereof (the portion may include any of the following features of each Internet page found: the URL, titles, content, brief description of the content, hyperlinks or any combination thereof). The local copies of the pages or portions thereof may then be searched using a search engine. The local copies of the pages, portions thereof or any pages or portions thereof that are the result of a search of the foregoing are all considered "Resulting Pages".

As shown in FIGS. 1A and 1B, the Resulting Pages 50 can generally be categorized as commercial, and non-commercial. Resulting Pages in the commercial category ("Commercial Pages") 52, 62 generally include those Resulting Pages that facilitate the buying and/or selling of goods and/or services or that evince an intent to conduct commercial activity by the publisher of that page (are commercial in nature). For example, Commercial Pages 52, 62 include pages that offer goods and/or services via sale, lease, trade, or other such transaction, or that provide contact information for such transactions to be made by some other means such as facsimile, telephone or in-person. Resulting Pages in the non-commercial category ("Non-Commercial Pages") 54, 64 generally include those that are informational in nature and do not facilitate the buying and/or selling of goods and/or services and hence are not commercial in nature. Non-Commercial Pages may alternately be called "Informational Pages."

Resulting Pages that are spam ("Spam Pages") are generally considered to be a subset of the Commercial Pages 52, 62, because Spam Pages 56 are generally commercial in nature. However, it is also possible for Spam Pages to be primarily informational in nature because Spam Pages provide information regarding goods and/or services, but do not themselves facilitate the buy of goods and/or services. Because, Spam Pages are designed to deceive or degrade search engines, including relevance-ordering heuristics, they are generally undesirable and may be removed or excluded from the search results. Usually, Spam Pages are considered commercial in nature because they provide a direct link to other pages that are commercial in nature\. Spam pages can be categorized as Commercial Pages, as shown in FIGS. 1A and 1B, or, alternatively, excluded from the commercial category.

In one embodiment of the invention, Resulting Pages may be further categorized in the premium-content containing category ("PCC Pages"). PCC Pages 58 are pages for which payment of a premium is required in order to gain access to the content. In some cases, payment of the premium is governed by an agreement or contract. There are many examples of PCC Pages 58 such as those found at the following URLs: www.law.com and www.northernlight.com. PCC Pages 58 can be considered either a subset of Commercial Pages and be placed in the Commercial category or a subset of Non-Commercial Pages and be placed in the Non-Commercial Category depending on the preferences of the user or search engine service customer. For example, PCC Pages 58 require payment of a premium in order to gain access. Because of the payment requirement, they have a commercial nature and may be considered a subset of the Commercial Pages, as shown in FIG. 1A. On the other hand, PCC Pages 58 generally provide information and do not facilitate the buying and/or selling of goods and/or services other than the information contained on the PCC Pages 58 themselves. Therefore, they also have an informational nature and may be considered a subset of the Non-Commercial Pages, as shown in FIG. 1B.

Figure 2:
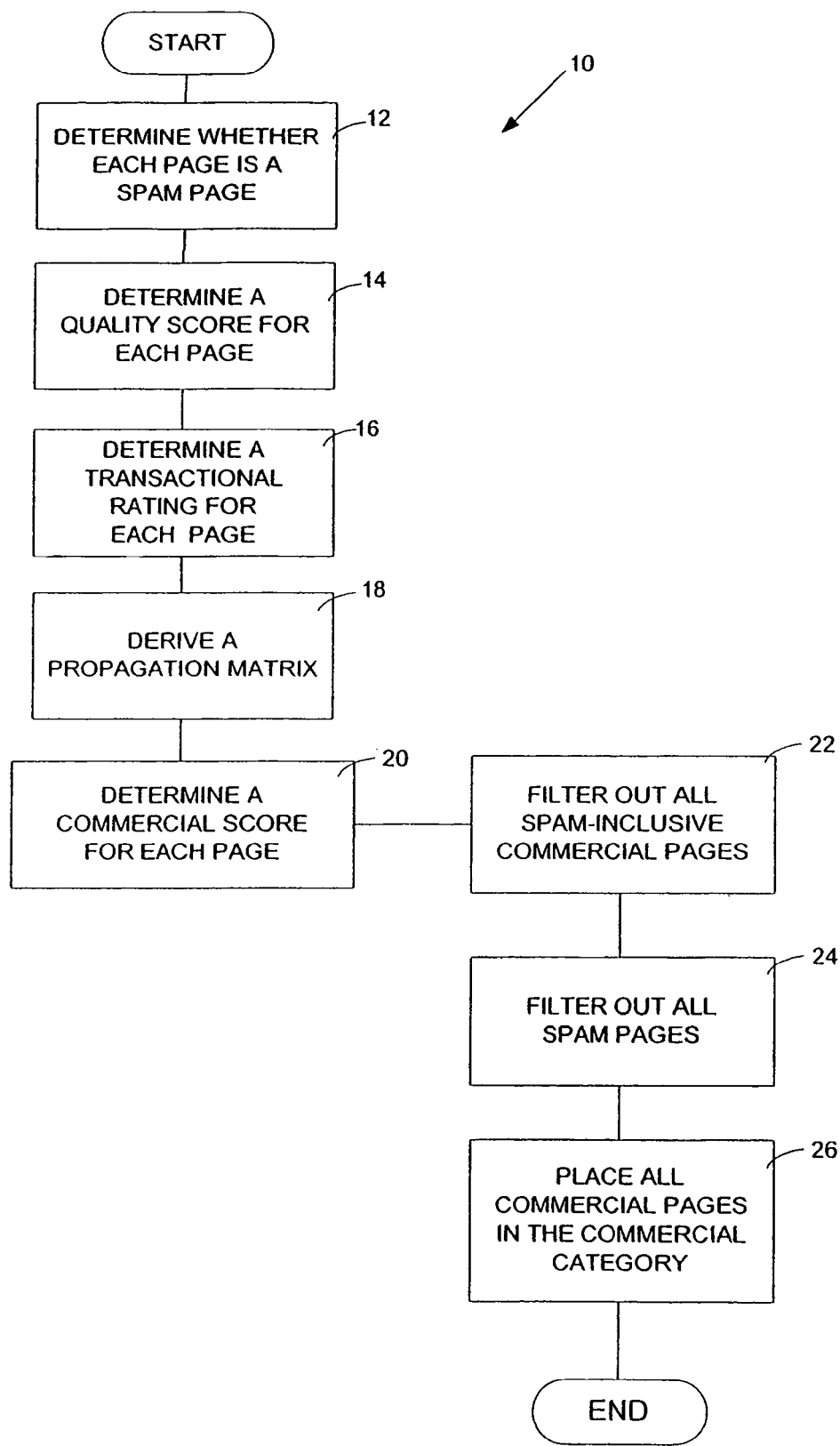
FIG. 2 is a flow chart of a system for determining whether a page is a Commercial Page, according to an embodiment of the present invention.

Yet another embodiment for filtering out the Commercial Pages and placing them in the commercial category generally comprises the steps shown in FIG. 2, indicated by reference numeral 10. These steps include: determining whether each page is a Spam Page 12; determining a quality score for each page 14; determining a transactional rating for each page 16; deriving a propagation matrix 18; determining a commercial score for each page 20; filtering out all pages with a commercial score that meets or exceeds a threshold value (the "Spam-Inclusive Commercial Pages") 22; filtering out the Spam Pages from the Spam-Inclusive Commercial Pages 24; and placing the Commercial Pages into the Commercial category 26.

In one embodiment, determining whether a page is a Spam Page involves computing a spam score, $\sigma(w_i)$ for each page and determining whether the spam score meets or exceeds the threshold value assigned to the spam score. The pages that meet or exceed the spam score threshold value are Spam Pages. Determining the spam score can be accomplished using known techniques, such as, having a human assign a score, and the automated techniques presented in the following papers, which are hereby incorporated by reference: a white paper by ebrandmanagement.com entitled "The Classification of Search Engine Spam" and a paper by Danny Sullivan entitled "Search Engine Spamming." Both documents appear in the Proceedings of Search Engine Strategies, Mar. 4-5, 2002, Boston, Mass., organized by Danny Sullivan. The foregoing and other known methods include both manual and automatic evaluation methods. These methods and similar machine-learning techniques could also be applied to computing tau ($\tau$), the initial vector in equation (12) described later herein.

The quality score, $q(w_i)$, is a scalar value that is a measure of the quality of a page. In one embodiment, determining the quality score of the pages includes evaluating a subset of pages against a select group of criteria. Criteria against which the quality of the page may be judged include quality of the content, reputation of the author or source of information, the ease of use of page and many other such criteria. The quality score may be human-assigned or determined automatically, and a default value may be assigned to pages not explicitly evaluated.

Figure 3:
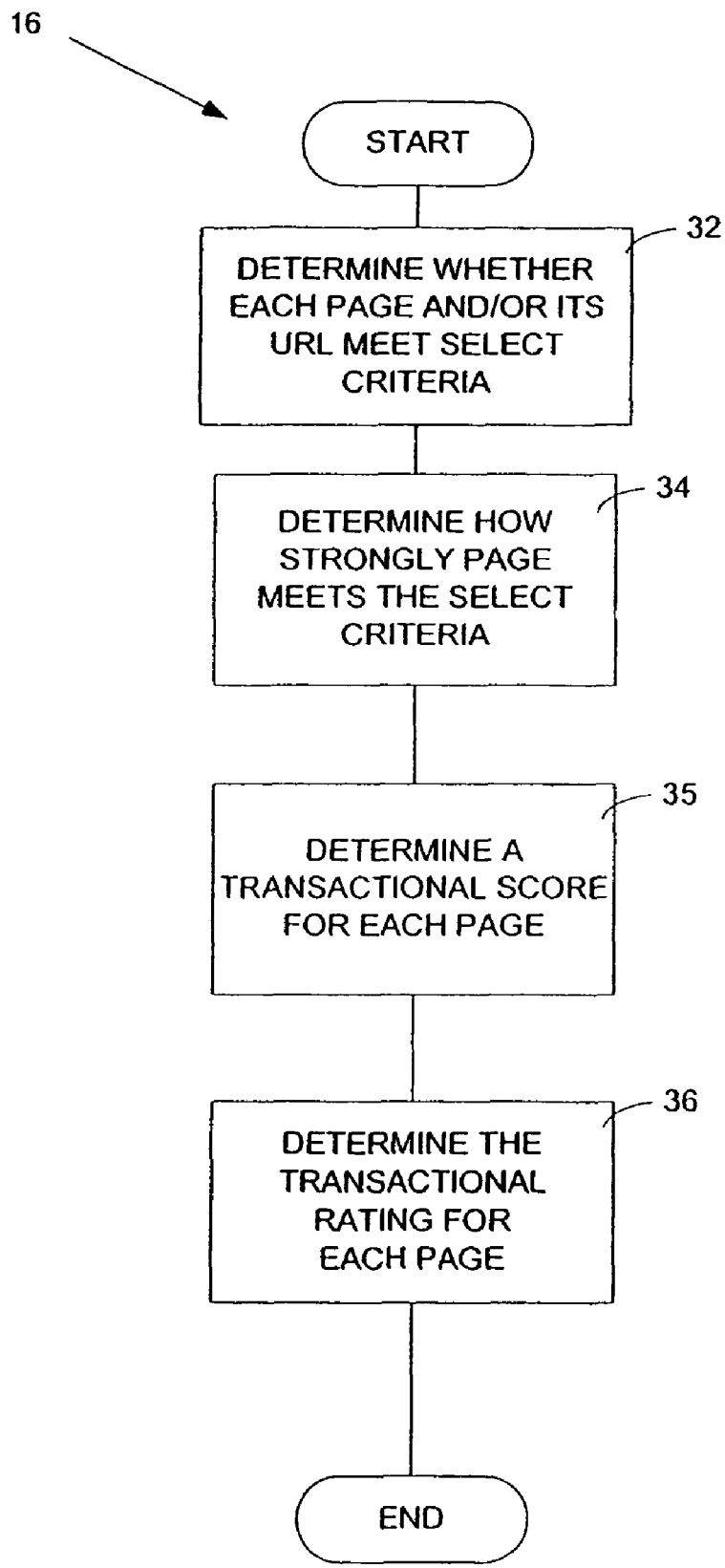
FIG. 3 is a flow chart of a system for determining a transaction rating for a page, according to an embodiment of the present invention.

A transactional rating is a scalar value that represents whether or how strongly a page facilitates transactions, such as a sale, lease, rental or auction. In one embodiment, the steps for determining a transactional rating for each page are shown generally in FIG. 3 and indicated by reference number 16. Transactional ratings are determined from a transactional score. A transactional score is a vector that represents whether or how strongly each page meets a specified set of criteria.

Therefore, the first step is to determine whether a page and/or the page's URL meet select criteria 32. There are many, many characteristics of a page that can be examined in order to ultimately determine whether the page is transactional in nature. These criteria include, determining whether the page includes the following: a field for entering credit card information; a field for a username and/or password for an online payment system such as PayPal™ or BidPay™, a telephone number identified for a "sales office," a "sales representative," "for more information call," or any other transaction-oriented phrase; a link or button with text such as "click here to purchase," "One-Click™ purchase," or similar phrase, text such as "your shopping cart contains" or "has been added to your cart," and/or a tag such as a one-pixel GIF used for conversion tracking. Any text matching may be either on text strings, such as sequences of characters in the Unicode or ASCII character sets, or on text derived from optical character recognition of text rendered in images, or speech recognition on a sound recording presented in response to an http (Hyper Text Transfer Protocol) request. The criteria can be used in any combination and any individual criteria may be used or not used. Additionally, these criteria are only examples and do not constitute an exhaustive list.

For each page, it must then be determined how strongly the page meets the selected criteria, block 34. Various techniques exist for determining whether pages meet certain criteria, 32, and how strongly they meet these criteria 34. For instance, each page may be examined by a human editor and evaluated in terms of the criteria and assigned either a Boolean value or a weighted value. This, however, is a very slow and subjective process. Much faster automated techniques include, automatically checking for or counting string matches, image matches or matches of string length and/or matches of data entry field type (such as numeric or alphanumeric) and assigning a log-likelihood score using language models. Language models include, for example, n-gram word transition models as described in Statistical Methods for Speech Recognition, Jenek, 1999. These methods can assign a Boolean number or a weighted value.

Using the results obtained by determining whether each page and/or its URL meet select criteria, 32, and determining how strongly the page and/or its URL meet select criteria, 34, a transactional score is determined, 35. Determining the transactional score 35 for each page includes creating a vector $\alpha k(wi)$ or a vector $\beta k(wi)$ from the results of blocks 32 and 34, respectively. One of these vectors is created for each page "wi", wherein the index "i" represents a particular page and the index "k" represents a particular criterion against which the page was evaluated. The number of elements in the vector "n" is determined by the number of criteria used and the number of vectors is determined by the number of pages "m." The transactional score $\alpha n(wi)$ is a vector of Boolean values wherein a "0" for a given criteria indicates that that criteria is not met (false) and any chosen integer "p" for a given criteria indicates that that criteria is met (true). The transactional score vector $\beta n(wi)$ has the same number of elements as $\alpha(wi)$. However, the elements in $\beta n(wi)$ can include any range of real numbers wherein each number indicates how strongly a page meets the criteria. For instance, $\beta n(wi)$ may include the real numbers between "0" and "1" (although it can include any range of real numbers) wherein "0" represents that a criterion is not met at all and "1" represents that a criteria is completely met. The real numbers between "0" and "1" represent the various degrees to which a criterium is met.

Transactional scores $\alpha k_n(w_i)$ and $\beta k_n(w_i)$ are used to determine alternate values for the transactional rating $\tau(w_i)$ for each page, 36, wherein:

$$\tau(w_i) = \|\alpha(w_i)\|_\rho = \left(\sum_{i=1}^{n} |\alpha(w_i)|^\rho\right)^{-\rho} \tag{1}$$

alternately:

$$\tau(w_i) = \|\beta(w_i)\|_\rho = \left(\sum_{i=1}^{n} |\beta(w_i)|^\rho\right)^{-\rho}, \tag{2}$$

The transactional rating $\tau(w_i)$ is a scalar value that is the $\rho$-norm of either the vector $\alpha_n(w_i)$ or the vector $\beta_n(w_i)$. "n" is the number of criteria used in evaluating each site $w_i$. Generally, $\rho=2$ so that no single weighted criterion dominates the others. However, $\rho$ can be altered to give more weight to the most dominant criteria, if desired. Either formula (1) or (2) may alternately be used to determine the transactional rating. Formula (2) reflects the degree to which individual criteria are met.

Figure 4:
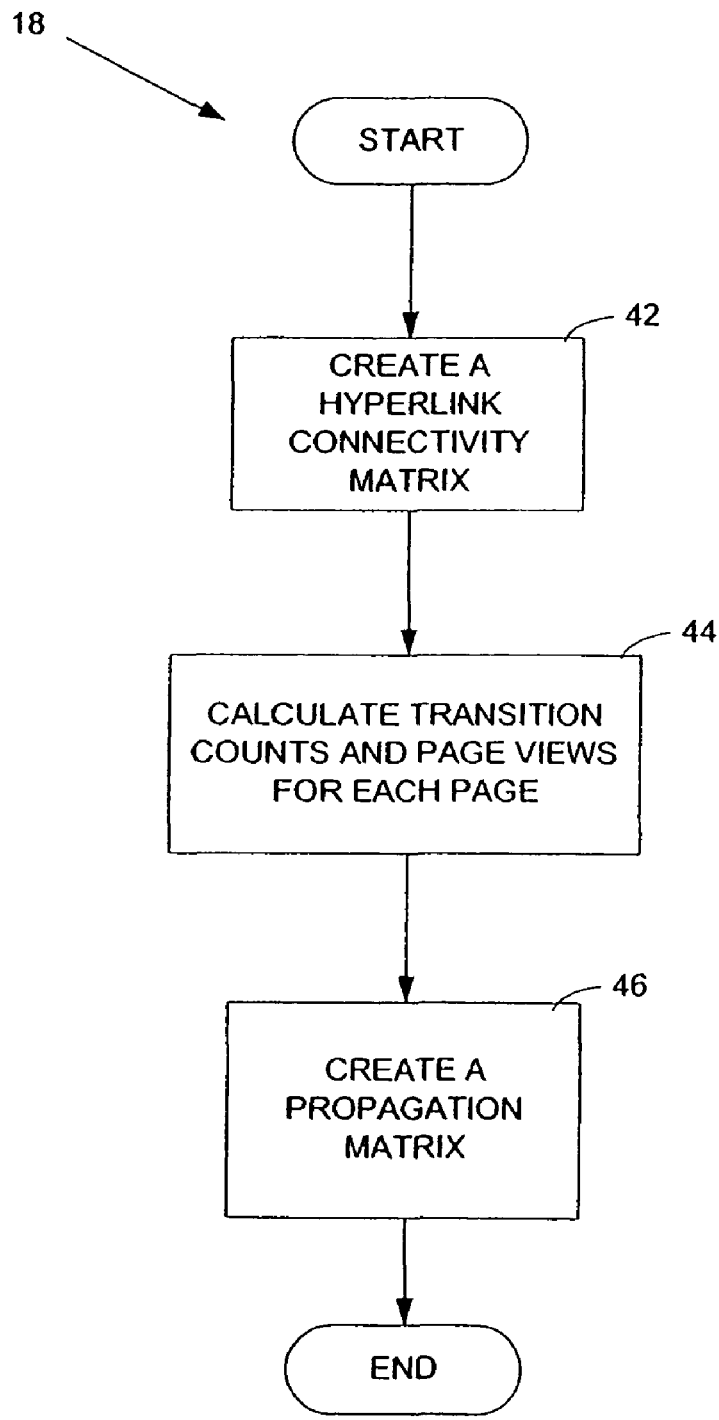
FIG. 4 is a flow chart of a system for creating a propagation matrix, according to an embodiment of the present invention.

The steps for deriving the propagation matrix are shown generally in FIG. 4 as reference numeral 18. The steps comprise, creating a hyperlink connectivity matrix 42, calculating transition counts and page views, 44, and creating a propagation matrix 46. A hyperlink connectivity matrix is a way of representing the link structure of the Internet, World Wide Web or any set of hyperdocuments and the relative importance or relevance of each page. In this embodiment, the relative importance of each page is determined by examining the number of links from each page $w_i$, to each page $w_j$, and from each page, $w_j$, to each page, $w_i$. These links are represented in the hyperlink connectivity matrix. The hyperlink connectivity matrix "C" has "m" rows and "m" columns. The number of rows and columns "m" equals the number of pages, wherein a specific row is indicated by index "i" and a specific column is indicated by column "j." Each element in this matrix, $C_{ij}$, will contain a value of "1" if and only if a page $w_i$ links to another page $w_j$, otherwise it will contain a "0".

The hyperlink connectivity matrix is then used to calculate two scalar values, the authority score $a_i$ and the hub score $h_i$ for each page $w_i$. In general, a hub is a page with many outgoing links and an authority is a page with many incoming links. The hub and authority scores reflect how heavily a page serves as a reference or is referenced itself. The values for the hub and authority scores are determined as follows, respectively:

$$h_i = \Sigma_j C_{i,j} \quad (3)$$

$$a_i = \Sigma_j C_{j,i} \quad (4)$$

The next step in determining the propagation matrix is to determine transition counts and page views, block 44. In one embodiment, each transition count, $T_{i,j}$, represents actual user behavior on the Internet in terms of how many times a user views a page $w_i$ and then directly views another page $w_j$ (without viewing any intervening pages). All the transition counts are represented in matrix form wherein $T_{i,j}$ represents each individual transition count. Pageviews represent the number of times a page was viewed and is related to the transition counts.

$$v_i = \Sigma_j T_{i,j} \quad (5)$$

Then the hyperlink connectivity matrix, hub score, authority score, transition counts, and pageviews are all used to create the propagation matrix, block 46. The propagation matrix P is created using the following formula:

$$P_{i,j} = \frac{f(C_{i,j}) + g(C_{i,j}, a_i) + h(T_{i,j}, v_i)}{F(h_i) + G(a_i) + H(v_i)} \quad (6)$$

The functions $F(h_i)$, $G(a_i)$ and $H(v_i)$ provide weights to the hub scores, authority scores and pageviews. These functions, $F(h_i)$, $G(a_i)$ and $H(v_i)$, are monotonically increasing scalar functions of non-negative integers, $h_i$, $a_i$ and $v_i$, respectively. Each of these functions corresponds to a weighing function, such as a step function. For example:

$$F(0)=0; \quad (7)$$

$$F(h_i)=F' \text{ if } 1 \leq \Sigma h_i \leq x; \text{ and} \quad (8)$$

$$F(h_i)=F'' \text{ if } \Sigma h_i > x, \quad (9)$$

wherein $F''>F'$. This gives a lower significance to a hub score if it is below a threshold value "x" which indicates that insufficient data was accumulated. $G(a_i)$ and $H(v_i)$ are determined in a similar manner. However, the threshold value for $G(a_i)$ will be a value "y" of $a_i$ and the threshold value for $H(v_i)$ will be a value "z" of $v_i$.

The functions $f(C_{i,j}, h_i)$, $g(C_{i,j}, a_i)$ and $h(T_{i,j}, v_i)$ represent the contributions of the links and transitions. Each function is a weighted quotient of its arguments, except when its denominator is zero. For example, $f(C_{i,j})$:

$$f(C_{i,j}) = F(h_i) \frac{C_{i,j}}{h_i} \text{ if } h_i > 0; \text{ and} \quad (10)$$

$$f(C_{i,j}, 0) = 0 \quad (11)$$

The functions $g(C_{i,j}, a_i)$ and $h(T_{i,j}, v_i)$ are determined in a similar manner.

As shown in FIG. 2, the next step in determining whether each page is commercial is determining a commercial score for each page 20. This determination involves not only the propagation matrix, P, and the transaction rating $\tau(w_i)$, but the spam score, $\sigma(w_i)$, and quality score, $q(w_i)$, as well. The transaction rating $\tau(w_i)$ and the spam score $\sigma(w_i)$ determine the weight of the different components. The commercial score is determined recursively for each page, $w_i$, by the following:

$$\kappa'(0) = \frac{A\tau(w_i) + Bq(w_i) + \sigma(w_i)}{A + B + 1} \quad (12)$$

for each page $w_i$ $$\kappa'(t) = \eta P^T \kappa'(t-1) + (1-\eta)\kappa'(0) \quad (13)$$

$$\kappa = \kappa'(t') \quad (14)$$

Where $\kappa'(0)$ is the weighted average of the transaction rating, $\tau(w_i)$, the spam score, $\sigma(w_i)$ and the quality score, $q(w_i)$. A and B are weighing factors that determine the weight given to $\tau(w_i)$ and $q(w_i)$, respectively. A and B may be selected by the search engine provider or creator. The vector $\kappa'(t)$ has an element $\kappa'_i(t)$ for every page examined $w_i$. $\eta$ is the propagation matrix weight and may also be set by the search engine provider or creator. $\eta$ determines the degree to which the propagation matrix affects the commercial score in the initial iterations. The symbol "t" indicates an incrementing integer that starts at one and increases by one for each iteration. Each iteration has the potential to affect all $w_i$. The iterations continue for a predetermined number of iterations "t" or until there is little variation in the value of the commercial score:

$$\|\kappa'(t') - \kappa'(t'-1)\|_\rho \leq \Delta \quad (15)$$

$\rho$ is the norm-level and $\Delta$ is a commercial score variation value. Once the difference in values obtained from two subsequent iterations equals or is less than the commercial score variation value, the iterations stop and the commercial score is obtained 22.

All pages with a commercial score above or equal to a commercial score threshold value are filtered out and comprise the Spam-Inclusive Commercial Pages 22. Although they may often be considered a subset of the Commercial Pages, the Spam Pages are filtered out from the Spam-Inclusive Pages 24 to yield the Commercial Pages, because Spam Pages are generally undesirable. The Commercial Pages are then placed into the commercial category 26. Once the Commercial Pages and the Spam Pages are filtered from the pages, the remaining pages are placed in the non-commercial category. The non-commercial category may also include the PCC Pages 58.

In another embodiment, pages are categorized into Commercial and Non-Commercial categories as described above, however Spam Pages are not separated into a distinct category. Instead, the Spam Pages are categorized as either Commercial or Non-commercial Pages depending on the underlying commercial score assigned to that page and the threshold scores for each category specified. Because Spam Pages may, in theory, be either commercial or non-commercial and because the inclusion of Spam Pages may be useful for some users and/or in some applications, this embodiment does not include a step for the identification and filter out Spam pages. By removing the identification and filtering of Spam Pages, this embodiment is more modularly compatible with existing search engines because many existing search engines are equipped with their own systems for identifying and eliminating Spam Pages. In yet another embodiment, the Spam Pages are not removed from the commercial category because Spam Pages do have potential value, for instance, as sales leads for a pay for performance search engine.

In another embodiment, categorization of Resulting Pages may be customized by or for the user (including consumers, Site Providers and Advertisers). In the first stage of the process, the user defines their categorization preferences by entering such preferences through the system's user interface and then refining their selections until the desired categorization is achieved. Both the categories themselves and how the Resulting Pages are categorized can be customized. The system can be customized to categorize Resulting Pages into categories specified by the user, using the previously described methods. Into which category a given Resulting Page is categorized can be effected by selecting any of the following alone or in combination: how PCC Pages 58 are categorized, the threshold levels, the p-norm level, parameters A and B in equation (12), the number of iterations t' for computing the commercial score, commercial score variation value $\Delta$, the criteria used to determine which Resulting Pages are Commercial or PCC Pages 58 and how much weight to give each criteria, the criteria used to determine the transaction score, and the transaction score formula used to determine the transaction rating (the "Categorization Criteria").

Figure 5:
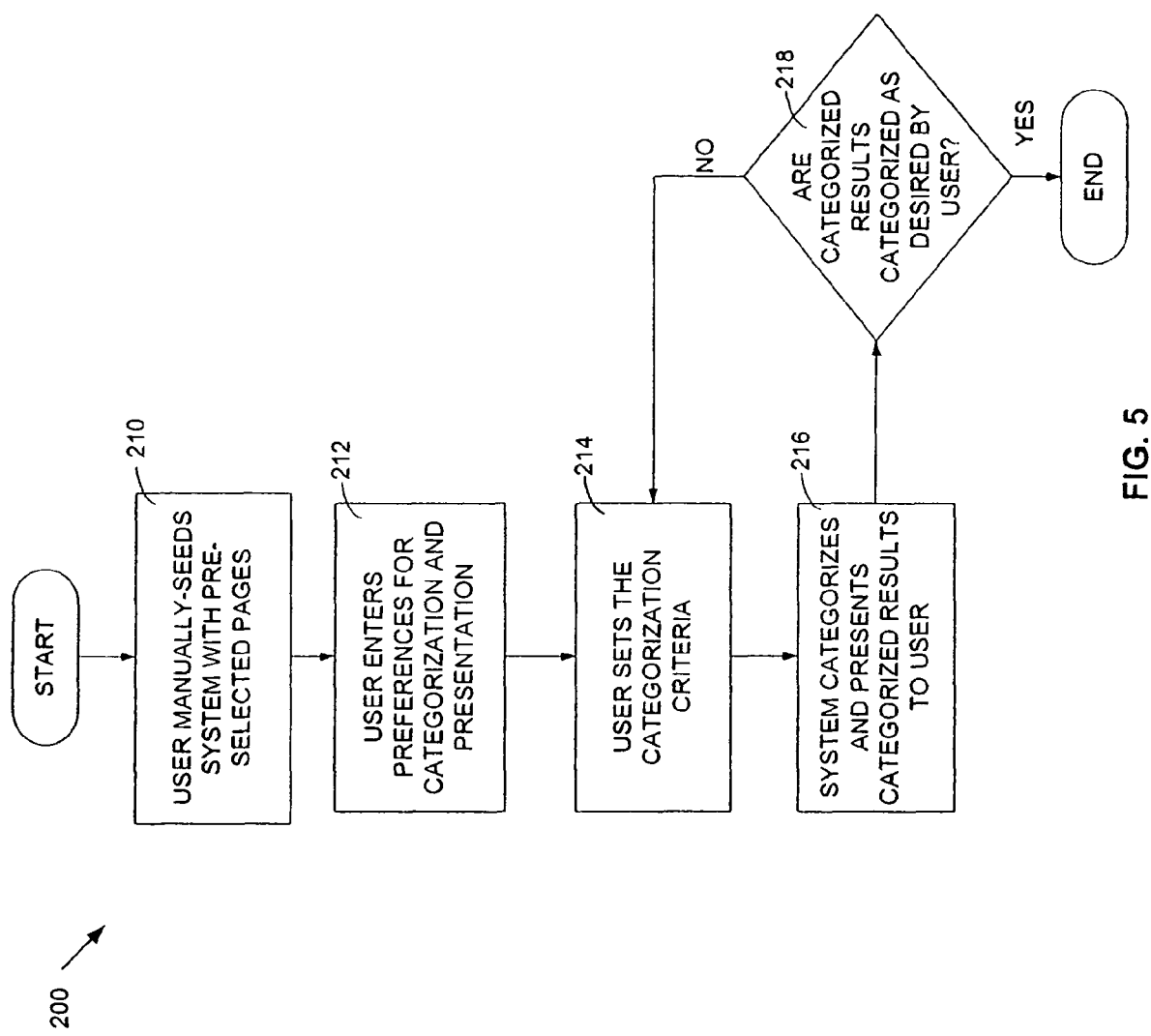
FIG. 5 is a flow chart of a system for providing customized categorization of search results, according to an embodiment of the present invention.

Categorization Criteria can all be chosen so that Resulting Pages are categorized and presented in a variety of ways in order to satisfy the user's preferences. In general, the Categorization Criteria may be chosen empirically by manual-seeding the system with pre-selected pages and examining the categories in which the pre-selected pages are categorized and then adjusting the Categorization Criteria to tune the system until the desired categorizations are achieved. For example, as shown in FIG. 5, the user hand-seeds the system 200 with pre-selected pages for which the user knows the categories into which the pages should be placed 210. The user then inputs the user's preferences in terms of the categories into which the pages are to be categorized and the format in which the categorized results should be displayed 212. The user then sets the Categorization Criteria 214. The system then categorizes and presents the categorized results to the user 216. The user then determines whether the system has categorized the pre-selected pages into the desired categories 218. If the pre-selected pages are not categorized in the desired categories, any one or combination of the Categorization Criteria may be altered and set in the system system 200. Steps 214, 216 and 218 may be repeated until the desired categorization is achieved.

In step 212, the user may set preferences for the way in which the categorized results are displayed. The results obtained from categorizing the Resulting Pages may be displayed in a variety of ways. For instance, the user may specify that only Resulting Pages matching a keyword search are to be categorized and presented or that a specific type or category of pages are to always be excluded, e.g. pornography or debt relief advertisements. Additionally or alternatively, the user may view the categorized pages contained in certain categories in a variety of ways, including displaying by category or only displaying particular categories while not others. Additionally or alternatively, the user may specify the order in which the categorized pages are to be displayed. For instance, the categorized pages may be displayed by category with a preferred category appearing first. Additionally or alternately, intermediate values such as the transaction score, transaction rating, hyperlink connectivity matrix, propagation matrix, transaction authority and hub scores, the commercial, spam and quality scores may also be displayed. Additionally or alternately, the user may also request that the anchor text of the links be examined. If the anchor text contains the keywords, the pages containing any number of the keywords would be given a higher weighting than the links that do not contain any of the keywords. Alternatively, links containing a greater number of keywords can be given a higher weighting than those with a lower number. Customizing the display of categorized pages be accomplished using known display and presentation techniques.

Figure 6:
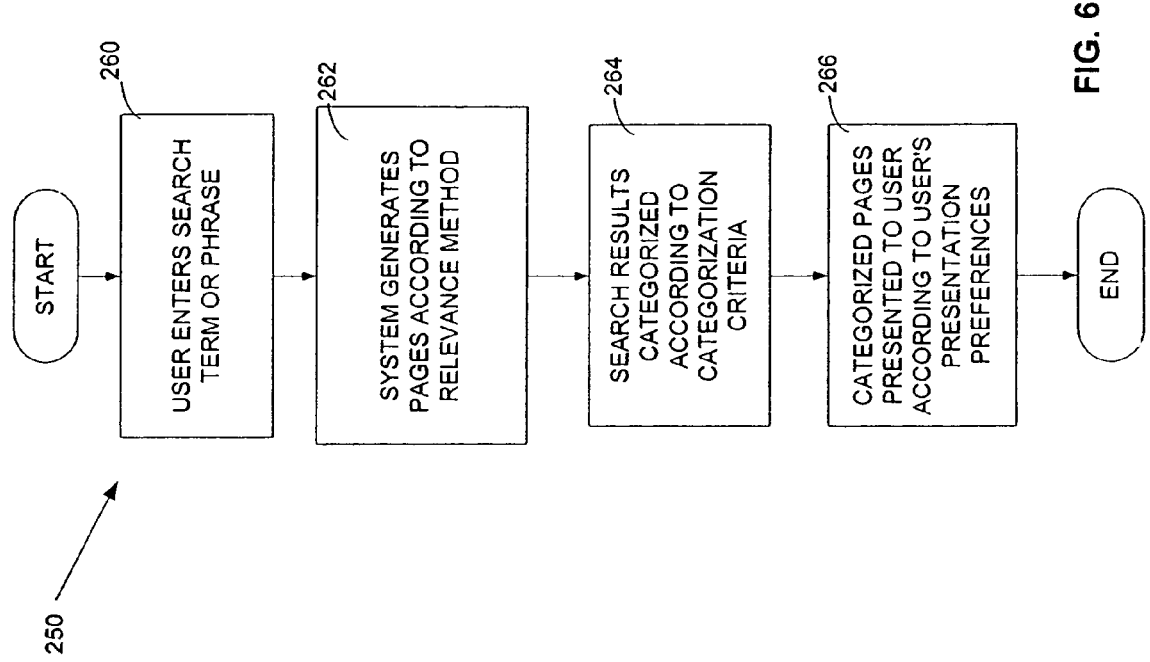
FIG. 6 is a flow chart of a system for providing customized search results and the presentation of the customized search results, according to an embodiment of the present invention.

Once the user has specified the categories, Categorization Criteria and display preferences, a search 250 may be performed, as shown in FIG. 6. A search 250 begins when a user enters a search term or phrase 260 into the system using a user interface. The system will then generate the Resulting Pages according to any of a variety of known relevance methods, including returning Resulting Pages that contain a keyword or the keywords that match the search term or phrase (the search results) 262. The system will then categorize the search results into categories specified by the user so that the Categorization Criteria specified by the user are satisfied 264. The system then presents the categorized pages according to the user's presentation preferences 266.

Figure 7:
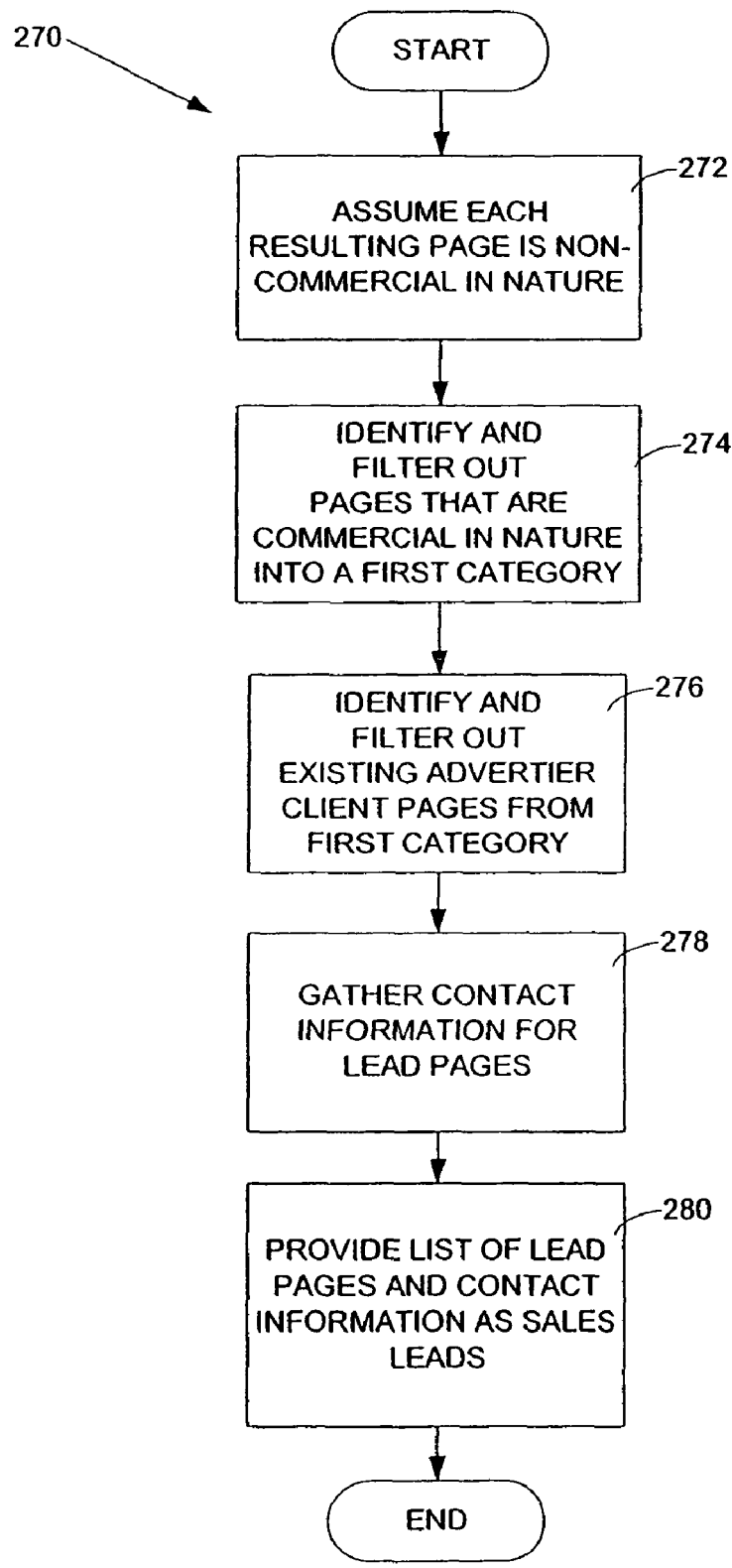
FIG. 7 is a flow chart of a system for automating the collection of sales leads for a pay for performance search engine sales staff, according to an embodiment of the present invention.

In a further embodiment, the Commercial Pages may be used to generate sales leads. Using the URLs of the Commercial Pages, contact 110 information for the companies hosting the Commercial Pages can be obtained from a domain name registry. The list of companies and their contact information can then be compiled to develop a list of sales leads. As depicted in FIG. 7 a system 270 for categorizing the Resulting Pages generally includes the following steps: (a) assume that each Resulting Page is non-commercial in nature 272; (b) identify and filter out the pages that are commercial in nature into a first category 274; (c) identify and filter out existing advertiser client pages from the pages in the first category 276; (d) gather contact information for the remaining pages ("lead pages") 278; and (e) provide the lead pages and their associated contact information as sales leads 280 to, for instance, a pay for performance search engine provider or any other interested party.

In another embodiment, advertisers are offered the opportunity to pay to have their listings included in or excluded from, certain categories, using the techniques described in U.S. Pat. No. 6,269,361, incorporated by reference, herein. The fee paid by the advertisers may be a function of the prominence given their listing in a select category. In a further embodiment, only pages for which a fee has been paid will appear in the commercial (or other designated) category. In one embodiment, a customizable system for categorizing and presenting the records or the results of a search of the records in a distributed database may be configured as an account management server or search engine server associated with a database search apparatus, such as the type disclosed in U.S. Pat. No. 6,269,361. The functions described herein and illustrated in FIGS. 1-8 may be implemented in any suitable manner.

One implementation is computer-readable source or object code that controls a processor of a server or other computing device to perform the described functions. The computer-readable code may be implemented as an article including a computer-readable signal-bearing medium. In one embodiment, the medium is a recordable data storage medium such as a floppy disk or a hard disk drive of a computer or a nonvolatile type of semiconductor memory. In another embodiment, the medium is a modulated carrier signal such as data read over a network such as the internet. The medium includes means in the medium for determining whether a page is transactional, means in the medium for deriving a propagation matrix for the page, and means in the medium for defining a commercial score as a function of the propagation matrix for the page. The various means may be implemented as computer source code, computer-readable object code or any other suitable apparatus for controlling a processing device to perform the described function.

Figure 8:
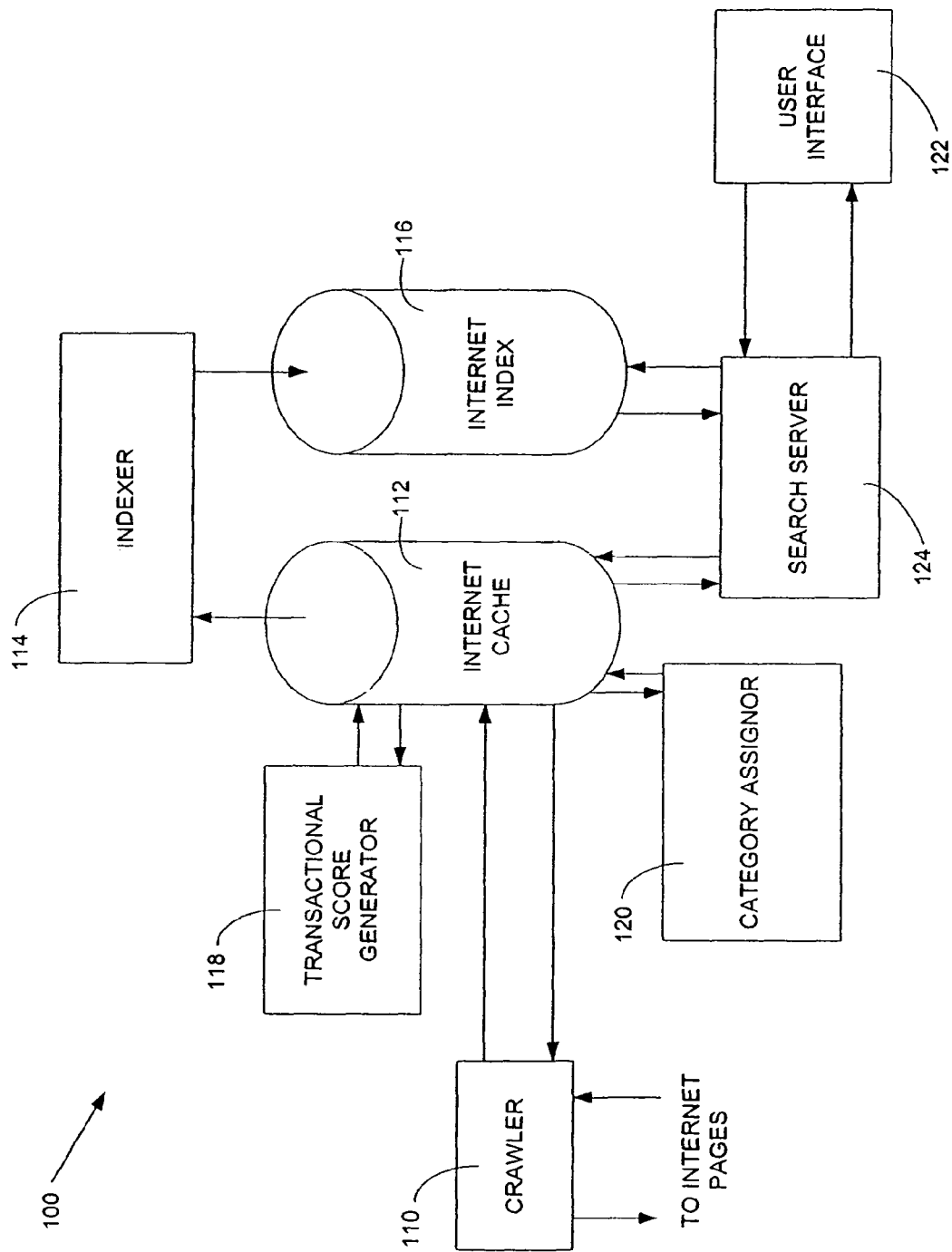
FIG. 8 is a diagram of an apparatus for categorizing and displaying search results, according to an embodiment of the present invention.

Another embodiment of the present invention constitutes an apparatus for categorizing and presenting the records or the results of a search of the records in a distributed database over a distributed client-server architecture is shown in FIG. 8. This search engine and database 100 shown in FIG. 8 generally comprises a computing apparatus 110, 114, 118, 120, memory devices 112 and 116, a server 124 and an interface 122. The computing apparatuses 110, 114, 118, 120 may include any processors that can perform computations. The crawler 110 is a computing apparatus that is connected to the Internet via a network and goes to every page and makes a copy of the page (the "Resulting Page"), including the static and/or dynamic content, whether text, image, audio, video or still images and stores the copy in the Internet cache 112. Alternatively, only a discrete number of parts of each Resulting Page, such as the URL and/or title are copied and stored in the Internet cache 112. Then the indexer 114 assigns each Resulting Page copy, or portion thereof, an address in the Internet cache 112 by (the "Internet cache address"). The indexer also generates search terms for each Resulting Page and stores these search terms with the associated Internet cache address, in the Internet index 116. The Internet cache and the Internet index would use approximately 30 terabytes and 5 terabytes, respectively, given the current size of the Internet.

The transaction score generator 118 uses the information contained in the copies of each Resulting Page (or portions thereof) stored in the Internet cache 112 to generate the transaction scores. These transaction scores are then stored in the Internet cache 112 with their associated Resulting Internet pages. The category assignor 120 uses the transaction scores and other information stored in the Internet cache 112 to generate the propagation matrix and assign a category to each Resulting Page. The transaction scores, commercial scores, quality scores, spam scores and categories for each page are stored in the Internet cache 112 with their associated pages. The customizable threshold values p, norm parameter p, commercial score variation values $\Delta$, etc. may be stored on the client or server side of the system as is well known to those skilled in the art. A search server 124 is coupled to the Internet index 116 and the Internet cache 112 and allows the apparatus to connect to the users via the system's user interface 122. The system's user interface 122 may be a browser or it may be agent or application software.

A user desiring to search the Internet may use the system user interface 122 to connect to the search server 124 via the Internet. If the system user interface 122 is a browser, it sends the user's search request to the search server 124 via the internet. Alternatively, if the user interface 122 is agent software, the agent sends an automated search request over the internet. Additionally, the user interface 122 may comprises both a browser and agent software and send an automated search request to the search server 124 over the Internet. The search server 124 then uses the Internet index 116 to determine which Resulting Pages are associated with the user's search terms. These Resulting Pages are then retrieved from the Internet Cache 112 and presented to the user via the user interface 122 in the manner specified by the user.

Figure 9A:
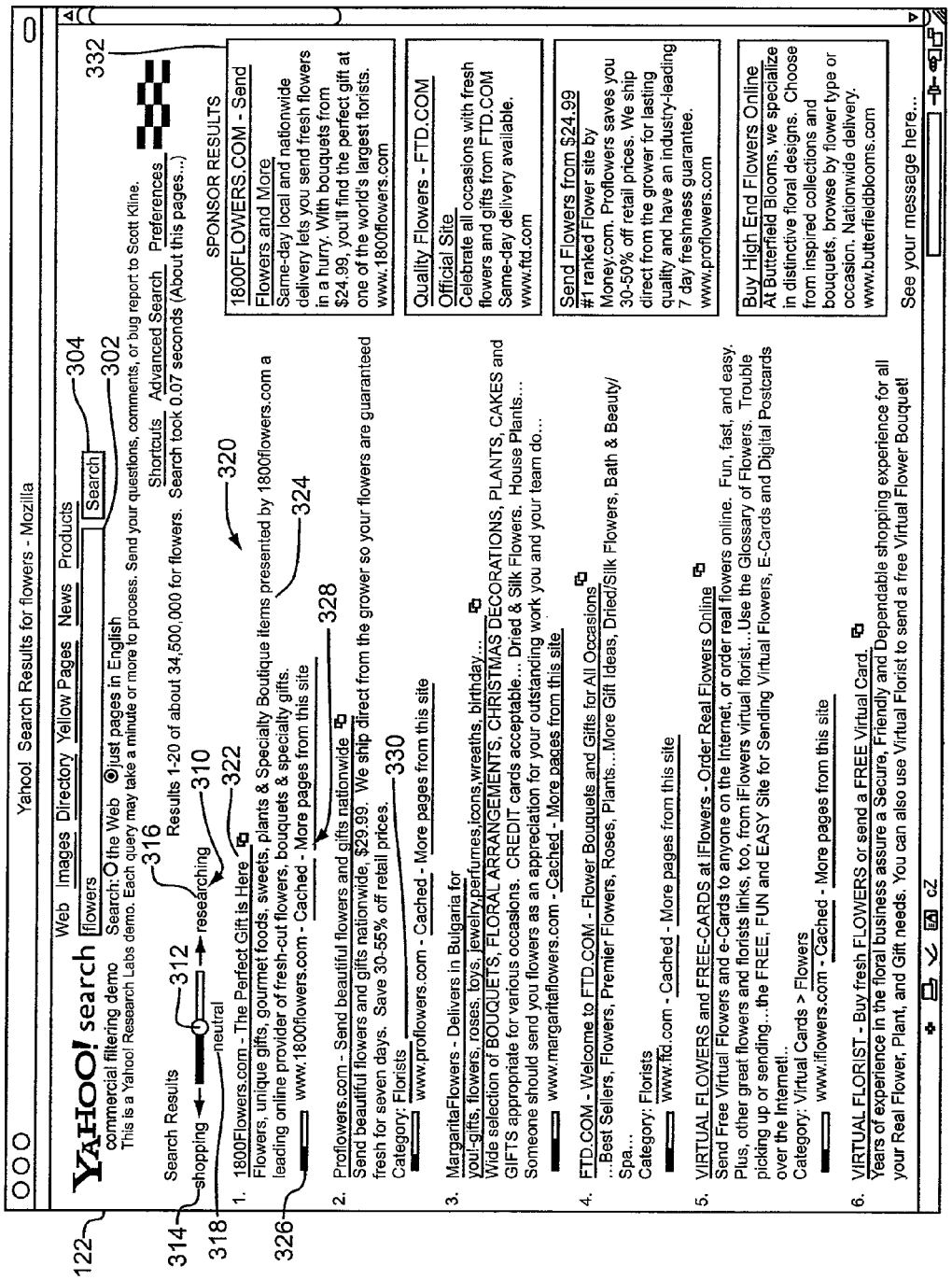
Figure 9B:
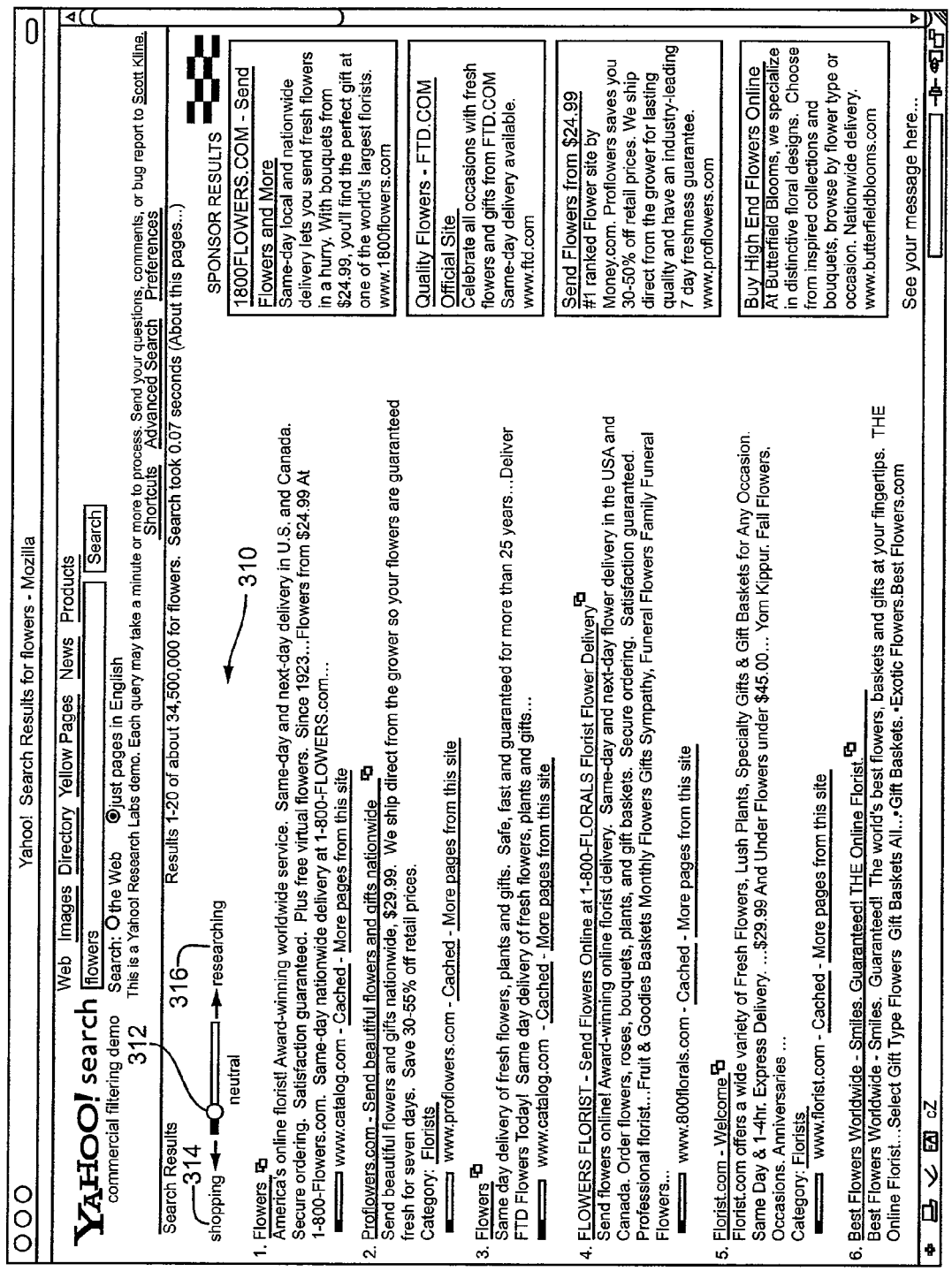

Exemplary screenshots of a user interface 122 are shown in FIGS. 9A-C. The user interface 122 may be implemented as a browser that displays Resulting Pages that meet a defined threshold level. The user interface 122 may be provided with user interface control 302 to collect user inputs, such as characters and numbers including search terms, words, portions of words and phrases, from the user. The user interface 122 may also include user interface control 304 for sending search requests to the search server 124 via the internet. Additionally, the user interface 122 may display information 320 associated with each Resulting Page returned from the search server 124. The information 320 may be extracted from metadata associated with each Resulting Page and may include a page title 322 and description 324. The information may also be extracted from other sources such as the content of the individual pages, the content or metadata associated with the cached versions of the pages, and the like. The title 322 may be implemented as a hyperlink which, upon selection, directs the user to the associated Resulting Page. The user interface 122 may also include additional options 328 that, for example, allow the user to retrieve the version of the Resulting Page stored in the Internet Cache 112 and/or find additional pages from the same site. Category information 330 and sponsored results 332 may also be displayed.

A commercial score may be generated for each Resulting Page returned by the search server 124. For example, the commercial score may be generated by the user interface 122 or a commercial score generator. The user interface 122 may be configured to display Resulting Pages based on the generated commercial score. For example, a threshold value, which may or may not be customizable by the user, may be used to customize which Resulting Pages are displayed. Where a commercial score is generated, the information 320 may also include a visual indicator 326 indicative of a categorization score for the page. In FIGS. 9A-C, the visual indicator 326 is implemented as a meter that depicts the level of commerciality of the Resulting Page. For example, the meter may show the relative commerciality of the page such that a higher level of commerciality (i.e. a higher commercial score) may be indicated by increasing the level of the meter. Alternatively, the meter may be configured to depict a higher commercial score by decreasing the level of the meter.

Referring also to FIG. 10, the visual indicator 326 may be implemented using any technique that visually conveys, for example, the commerciality of the Resulting Page to the user. For example, pages meeting a threshold commerciality score may be denoted by indenting 334 and highlighting 336 the information 320 associated with those pages. Other exemplary techniques for indicating that a Resulting Page meets a threshold level of commerciality include changing font sizes and/or colors of any and/or all of the various aspects of the associated information 320, using different font or background colors for the information 320, displaying raw or adjusted values of the commercial score 338, displaying graphics associated with various commercial score levels, and the like. Optionally, the user interface 122 may be configured to change the style of the visual indicators based on user preferences. The visual indicators may change based on the threshold value. For example, a first indicator may be used when the threshold value is in a first range, and a second indicator may be used when the threshold value is in a second range.

In FIGS. 9A-C, the user interface 122 may include a user preference object 310 for collecting user preference information. For example, the user may set a preference for the type or category of desired results, e.g., commercial results. Alternatively or additionally, the user preference may indicate a desire to view a determined mix of commercial and non-commercial results. The user preference object 310 may be implemented as a slide bar that allows the user to select the preferred type of results. The user may select to view commercial results by setting the value of the slider 312 closer to the shopping indicator 314. Similarly the user may set a preference for non-commercial results by setting the value of the slider 312 to the researching indicator 316. For a mix of commercial and non-commercial results, the user may set the value of the slider 312 on the bar between the shopping indicator 314 and the researching indicator 316. To receive approximately equal commercial and non-commercial results, the user may set the value of the slider 312 near the neutral indicator 318. Other types of interface objects may be used to collect user search preferences in addition to or in place of the slider 312, such as text boxes, check boxes, scroll bars, or other graphical interface objects.

The search server 124 may use the Internet index 116 to determine which Resulting Pages are associated with the user's search terms. These Resulting Pages are then retrieved from the Internet Cache 112, and a score may then be calculated for each of the Resulting Pages and the Resulting Pages may be sorted based on the score. The score may be generated according to an equation that blends the Resulting Pages among two dimensions. For example, the Resulting Pages may be sorted by relevance and commerciality.

A score may be generated for each Resulting Page according to the following:

$$\text{score(page)} = \frac{(1-|s|)(n-p)}{n} - s*c*g \quad (16)$$

wherein n is equal to the total number of Resulting pages, p is equal to the position of the page in the original result set (i.e. relevance ranking of the Resulting Page), c is equal to the output of the classifier (i.e. commerciality of the page), g is equal to a gain factor, and s is equal to a number indicative of the user's display preferences. The gain factor g may be set to one. Other values may be used to alter the weights of the various dimensions. Scores for a given page may be calculated among any number of dimensions and using other equations that dynamically reorder the Resulting Pages based on user input.

The value of s may be set by the position of the slider 312. The value of s is set to a value in the range of −1 to 1, such that a value of −1 corresponds to a desire to view non-commercial results, a value of 1 corresponds to a desire to view commercial results, and a value of zero corresponds to no preference. The user may indicate a desire to view pages of a particular type by moving the slide to set the value of the slider 312. The user interface 122 may be configured to default to a slider value of zero, i.e. no preference. The user interface 122 may be configured to store the value of the slider so that previously defined user preferences are saved. The user interface 122 may be configured to dynamically recalculate scores for each page every time the user changes the value of the slider 312. For example, the user interface 122 may be updated automatically to display more commercial or non-commercial results in response to the user preference as shown in FIGS. 9B and 9C, respectively.

Figure 11:
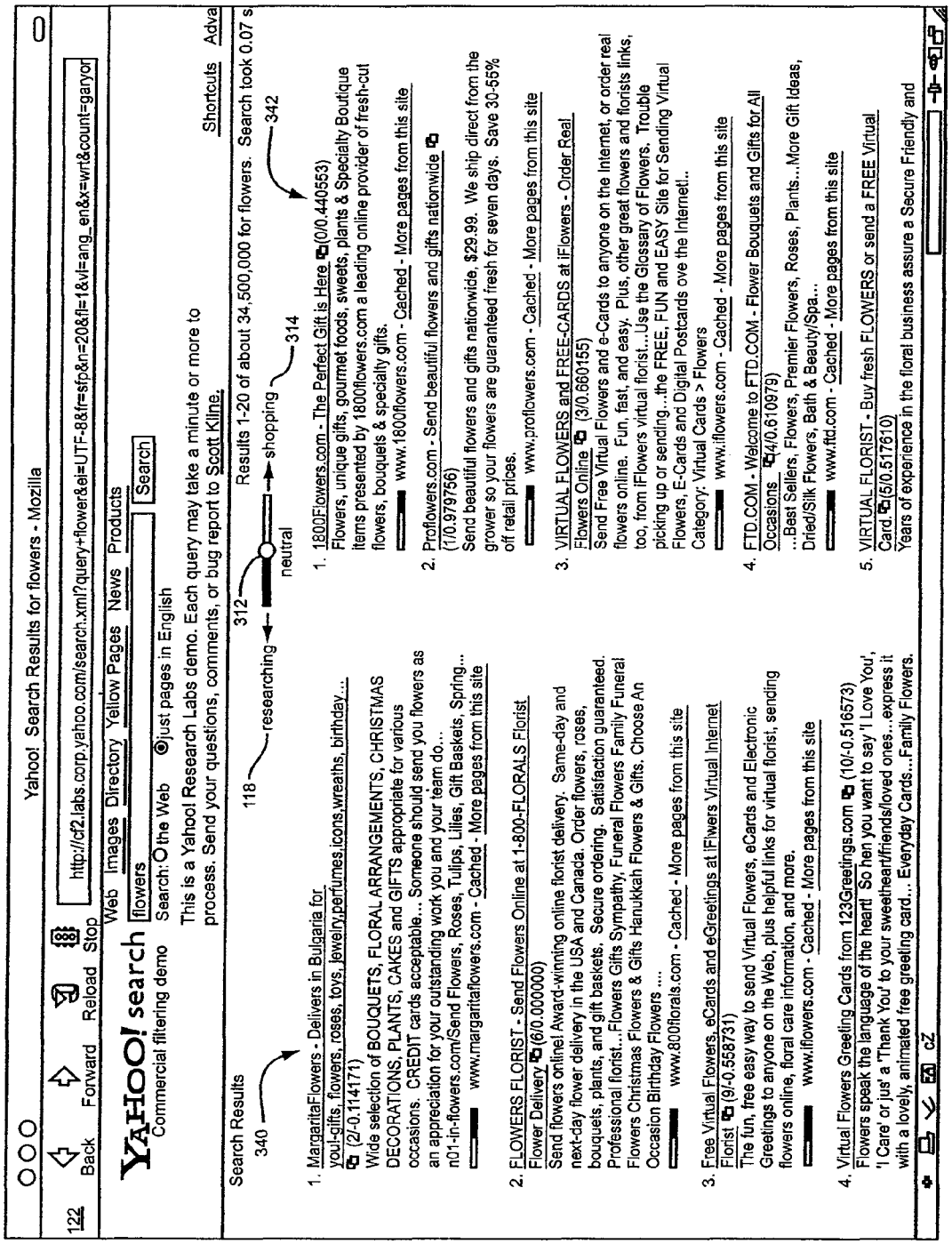
FIGS. 11A-B are other exemplary screenshots of a user interface.
Figure 11B:
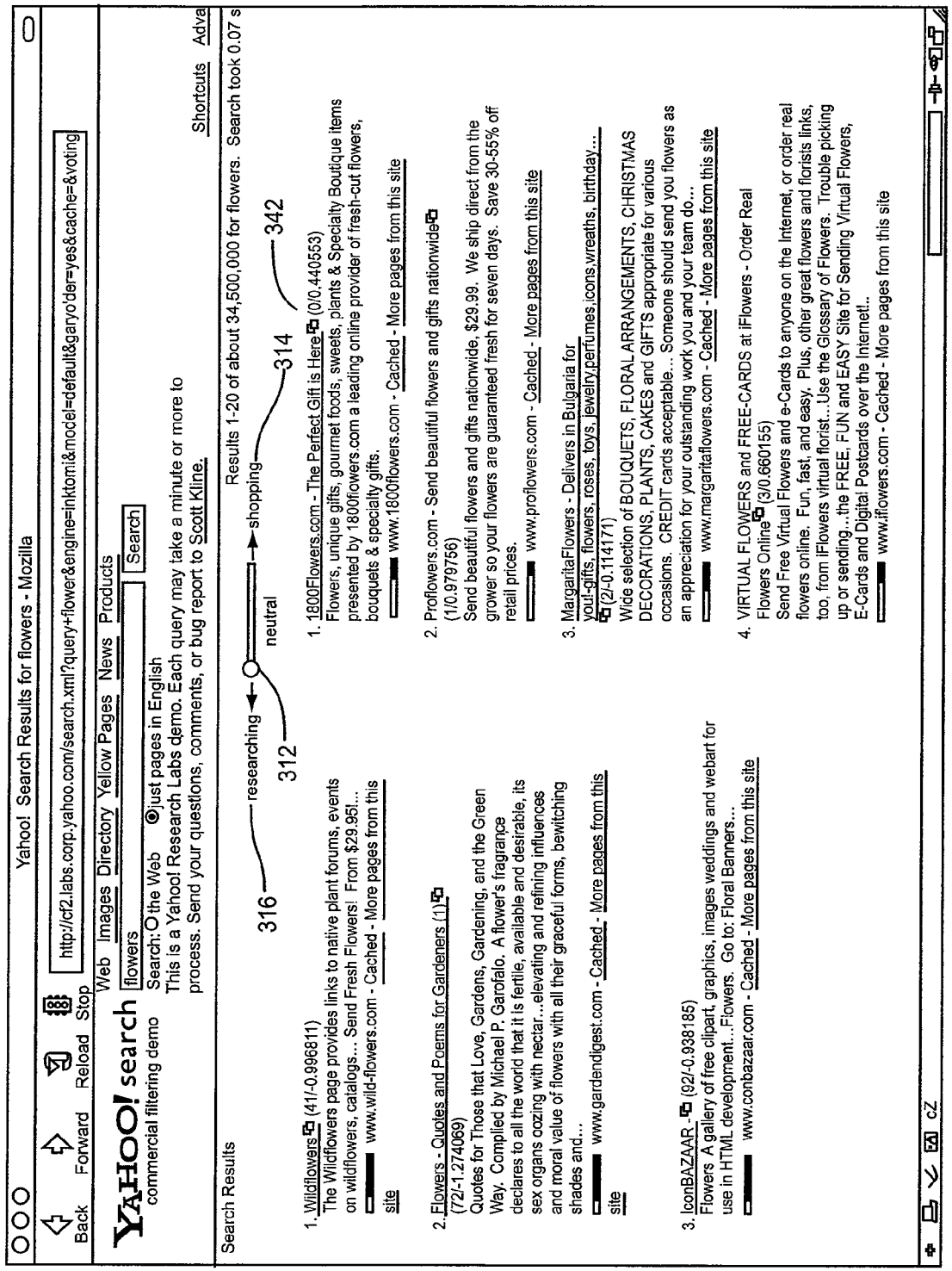

In FIGS. 11A-B, exemplary screenshots are shown of another exemplary user interface 122. The user interface 122 may be configured to sort Resulting pages into two sets, one having a commercial score below the threshold level and the remaining Resulting Pages in the second. Each set may be displayed in an associated column 340 and 342. Each set may be displayed in accordance with any sorting preference, such as a sorting preference of the user. For example, each set may be displayed according to their relevance to a user defined keyword, the commercial score determined by the user interface 122, or the like. Preferably, the slider 312 may be used to allow the user to vary the threshold value. For example, the user may define a preference to view non-commercial results by moving the slider 312 toward the non-commercial indicator 316, as shown in FIG. 11B. In response, the user interface 122 may recalculate the sets of resulting pages and update the display accordingly.

From the foregoing, it can be seen that the presently disclosed embodiments provide a method and apparatus for categorizing and presenting select elements of a distributed database. Further advantages include providing advertisers, search service providers and users with a search engine and database that permits the customizable categorization of search results and providing a method and apparatus for filtering search results so that only a desired category or categories of search results are returned or displayed.

Further benefits of the presently disclosed embodiments include providing to users, advertisers, search site providers and search engine providers a method of customizing searches to search and/or display search results according to category or criteria, and providing advertisers with a method for controlling with which other links that advertiser's products and/or services are categorized and displayed. Still further, the present embodiments disclose providing a method of identifying the nature of a site and providing a search engine capable of categorizing search results, as well as providing a search engine that is customizable by users and advertisers.

Although the invention has been described in terms of specific embodiments and applications, persons skilled in the art can, in light of this disclosure, generate additional embodiments without exceeding the scope or departing from the spirit of the claimed invention. For example, the system and methods presented herein may be applied not just to databases accessed over the Internet, but to any distributed database. Furthermore, there is a vast variety of categories into which the pages or documents may be placed and in the criteria used to place them there. Accordingly, it is to be understood that the drawings and descriptions in this disclosure are proffered to facilitate comprehension of the invention and should not be construed to limit the scope thereof.

We claim:

1. A method for providing search results to a user, the method executed with a search engine having a processor, comprising:

receiving, by the search engine, a first set of information associated with a plurality of web pages ranked according to relevancy;

receiving, by the search engine, a second set of information associated with a user preference, wherein the second set of information corresponds to a threshold commercial score value;

determining, by the processor, a commercial score for each web page;

determining, by the processor, a subset of the first set of information based on the second set of information;

generating, by the processor, a visual indicator for at least each web page of the subset of the first set of information that at least meets the threshold commercial score;

displaying, by the search engine, the subset and each visual indicator corresponding to each respective web page on a results page of a display;

displaying, by the search engine, on the results page a user preference object to collect the second set of information, wherein the user preference object is selectively adjustable by the user to change the user preference according to a level of desired commerciality;

wherein the search engine automatically updates the determining the commercial score for each web page, determining the subset, and displaying the subset and each visual indicator when the user changes the second set of information through the user preference object; and wherein determining the commercial score for each web page comprises:

determining a transaction score for each web page related to a plurality of criteria based on whether and how strongly each web page facilitates commercial transactions according to respective transactional scores;

determining a quality score for each of the subset of the plurality of web pages according to a second plurality of criteria, wherein the second plurality of criteria is different than the plurality of criteria in that the second plurality of criteria is selected from the group consisting of: quality of content, reputation of author or source of the content, and ease of use of the web page; and producing a weighted average of the transaction score and the quality score.

2. The method of claim 1, wherein the subset of the first information is determined by comparing the commercial scores for each associated web page to the threshold commercial score value.

3. The method of claim 2, wherein the first subset includes information associated with those web pages having a commercial score exceeding the threshold commercial score value.

4. The method of claim 2, further comprising generating a second subset of the first information, the second subset including a remainder of the first set of information.

5. The method of claim 4, wherein the displaying step further includes displaying the subset in a first display area and displaying the second subset in a second display area.

6. The method of claim 1, wherein the subset is determined upon collection of the second set of information.

7. The method of claim 1, wherein the visual indicator further comprises a number indicative of the commercial score.

8. The method of claim 1, wherein the visual indicator further comprises a meter indicative of the commercial score.

9. The method of claim 1, further comprising:

dynamically changing the visual indicator to a different visual indicator based on a range within which falls the threshold commercial score collected by the user preference object.

10. The method of claim 1, wherein the visual indicator comprises a paragraph indentation indicating the subset of the first set of information.

11. The method of claim 1, wherein determining the commercial score of each web page further includes deriving and applying a propagation matrix, wherein deriving the propagation matrix comprises:

creating a hyperlink connectivity matrix that represents a link structure of the plurality of web pages and a relative importance of each web page based on a number of links to and from each web page;

determining an authority score and a hub score for each web page from information in the hyperlink connectivity matrix, the hub score being related to a number of outgoing links and the authority score being related to a number of incoming links;

determining a number of transition counts and a number of page views related to the number of transition counts for each web page; and generating the propagation matrix by combining with the hyperlink connectivity matrix the authority scores, the hub scores, the transitions counts, and the pageviews.

12. A search engine for delivering search results to a client computer of a user, comprising:

a processor coupled with an internet cache database and with an internet index database comprising a plurality of web pages;

a user interface coupled with the processor and with the index and cache databases for communication with a web browser of the client computer, the user interface including a display area having a user preference object for receipt of a user preference from the user, the user preference corresponding to a threshold commercial score indicative of a desire to view a determined mix of commercial and non-commercial results, the display area further to receive a search query from the user and to display search results associated with a plurality of web pages in response thereto; and a commercial score generator coupled with the processor and the cache database, wherein the commercial score generator generates, for each of at least a plurality of the search results, a commercial score by:

determining a transaction score for each web page related to a plurality of criteria based on whether and how strongly each web page facilitates commercial transactions according to respective transactional scores;

determining a quality score for each of the web pages of the at least a plurality of search results according to a second plurality of criteria, wherein the second plurality of criteria is different than the plurality of criteria in that the second plurality of criteria is selected from the group consisting of: quality of content, reputation of author or source of the content, and ease of use of the web page; and producing a weighted average of the transaction score and the quality score;

wherein the processor ranks the search results to be displayed in the user interface according to a relevancy method, and displays therewith a visual indicator for at least each search result having a commercial score at least as high as the threshold commercial score, wherein the visual indicator indicates a level of commerciality.

13. The search engine of claim 12, wherein the user preference object is capable of being set to a plurality of values.

14. The search engine of claim 13, wherein the user preference object comprises a slider.

15. The search engine of claim 12, wherein the determined mix corresponds to a desire to view more commercial results than non-commercial results.

16. The search engine of claim 12, wherein the determined mix corresponds to a desire to view less commercial results than non-commercial results.

17. The search engine of claim 12, wherein the determined mix corresponds to a desire to view only commercial results.

18. The search engine of claim 12, wherein the plurality of criteria is selected from the group consisting of whether a web page includes: a field for entering credit card information; a field for a username or password for an online payment system; a telephone number identified for a sales office; and text that makes reference to a shopping cart.

19. The search engine of claim 12, wherein the commercial score generator derives a propagation matrix based on a hyperlink connectivity matrix.

20. The search engine of claim 12, wherein the commercial score generator eliminates a subset of the at least plurality of search results that are determined to be spam according to a second plurality of criteria.

21. The search engine of claim 12, wherein the visual indicator comprises a meter indicative of the commercial score.

22. The search engine of claim 12, wherein the visual indicator comprises a graphics-based visual indicator, further comprising:

dynamically changing the graphics-based visual indicator to a different graphics-based visual indicator based on a range within which falls the threshold commercial score collected by the user preference object.

23. The search engine of claim 12, wherein the visual indicator comprises a paragraph indentation of the search results indicative of the first set of information.

* * * * *